United States Patent
Khoshnevisan et al.

(10) Patent No.: US 11,632,199 B2
(45) Date of Patent: Apr. 18, 2023

(54) HYBRID AUTOMATIC REPEAT REQUEST ACKNOWLEDGMENT FOR DOWNLINK CONTROL INFORMATION WITHOUT PHYSICAL DOWNLINK SHARED CHANNEL SCHEDULING

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 17/115,519

(22) Filed: Dec. 8, 2020

(65) Prior Publication Data

US 2021/0258107 A1 Aug. 19, 2021

Related U.S. Application Data

(60) Provisional application No. 62/976,682, filed on Feb. 14, 2020.

(51) Int. Cl.
*H04L 1/18* (2023.01)
*H04L 1/1829* (2023.01)
(Continued)

(52) U.S. Cl.
CPC .......... *H04L 1/1854* (2013.01); *H04L 1/1812* (2013.01); *H04L 1/1861* (2013.01); *H04W 72/042* (2013.01); *H04W 72/0446* (2013.01)

(58) Field of Classification Search
CPC ... H04L 1/1854; H04L 1/1812; H04L 1/1861; H04L 1/1822; H04L 1/1614;
(Continued)

(56) References Cited

U.S. PATENT DOCUMENTS

| 2017/0079019 A1 | 3/2017 | Yang et al. |
| 2019/0312713 A1 | 10/2019 | Yang et al. |

(Continued)

FOREIGN PATENT DOCUMENTS

| CN | 111835489 A | 10/2020 |
| CN | 111835489 A | 10/2020 |

(Continued)

OTHER PUBLICATIONS

Le, T-K., et al., "An Overview of Physical Layer Design for Ultra-Reliable Low-Latency Communications in 3GPP Release 15 and Release 16", Electrical Engineering and Systems Science, Signal Processing, Feb. 2020, 8 Pages.
(Continued)

*Primary Examiner* — Vinncelas Louis
(74) *Attorney, Agent, or Firm* — Harrity & Harrity, LLP \ Qualcomm

(57) ABSTRACT

Various aspects of the present disclosure generally relate to wireless communication. In some aspects, a UE may determine that a DCI message requests Type 3 HARQ-ACK and does not schedule a PDSCH communication; and determine, based at least in part on a PDSCH to HARQ feedback timing indicator of the DCI message, a time to transmit the Type 3 HARQ-ACK. Numerous other aspects are provided.

30 Claims, 15 Drawing Sheets

(51) Int. Cl.
*H04L 1/1812* (2023.01)
*H04W 72/0446* (2023.01)
*H04W 72/04* (2023.01)

(58) Field of Classification Search
CPC ... H04L 1/1896; H04L 1/1685; H04L 1/0003; H04W 72/042; H04W 72/0446
See application file for complete search history.

(56) References Cited

U.S. PATENT DOCUMENTS

| | | |
|---|---|---|
| 2020/0344012 A1 | 10/2020 | Karaki et al. |
| 2021/0037516 A1 | 2/2021 | Lyu et al. |
| 2021/0352704 A1 | 11/2021 | Yang et al. |
| 2021/0352731 A1 | 11/2021 | Yang et al. |
| 2022/0045801 A1 | 2/2022 | Wang |
| 2022/0132541 A1* | 4/2022 | Kim ............... H04L 1/0003 |

FOREIGN PATENT DOCUMENTS

| | | |
|---|---|---|
| WO | 2019216816 A2 | 11/2019 |
| WO | 2020033237 A1 | 2/2020 |
| WO | WO-2021162050 A1 * | 8/2021 |

OTHER PUBLICATIONS

3GPP TS 38.212: "3rd Generation Partnership Project; Technical Specification Group Radio Access Network; NR; Multiplexing and Channel Coding (Release 15)", 3GPP Standard; Technical Specification; 3rd Generation Partnership Project (3GPP), Mobile Competence Centre; 650, Route Des Lucioles; F-06921 Sophia-Antipolis Cedex; France, vol. RAN WG1, No. V15.7.0, Sep. 28, 2019 (Sep. 28, 2019), pp. 1-101, XP051785088.
3GPP TS 38.213: "3rd Generation Partnership Project, Technical Specification Group Radio Access Network, NR, Physical Layer Procedures for Control (Release 16)", 3GPP Standard, Technical Specification, 3GPP TS 38.213, 3rd Generation Partnership Project (3GPP), Mobile Competence Centre, 650, Route Des Lucioles, F-06921, Sophia-Antipolis, Cedex, France, vol. RAN WG1, No. V16.0.0, Dec. 2019, Jan. 14, 2020 (Jan. 14, 2020), XP051860806, pp. 1-146.
"3rd Generation Partnership Project; Technical Specification Group Radio Access Network; NR; Physical layer procedures for control (Release 16)," 3GPP Standard; Technical Specification; 3GPP TS 38.213, 3rd Generation Partnership Project (3GPP), Mobile Competence Centre, 650, Route Des Lucioles, F-06921, Sophia-Antipolis Cedex, France, vol. RAN WG1, No. V16.3.0, Oct. 2, 2020 (Oct. 2, 2020), pp. 1-179, XP051961308.
Moderaior (Huawei): "Feature Lead Summary# on Email Discussion 100b-e-NR-unlic-NRU-HARQ-01 (Type-3 HARQ-ACK Codebook)," 3GPP Draft, 3GPP TSG RAN WG1 Meeting #100bis, R1-2002922, 3rd Generation Partnership Project (3GPP), Mobile Competence Centre, 650, Route Des Lucioles, F-06921, Sophia-Antipolis Cedex, France vol. RAN WG1. No. Online Meeting, Apr. 20, 2020-Apr. 30, 2020, Apr. 28, 2020 (Apr. 28, 2020), XP051878632, 35 pages.
Qualcomm Inuorporated: "TP for Enhancements to Scheduling and HARQ Operation for NR-U," 3GPP Draft, 3GPP TSG RAN WG1 Meeting #100bis-e, R1-2002532, 3rd Generation Partnership Project (3GPP), Mobile Competence Centre, 650, Route Des Lucioles, F-06921, Sophia-Antipolis Cedex, France, vol. RAN WG1. No. Online Meeting, Apr. 20, 2020-Apr. 30, 2020, Apr. 11, 2020 (Apr. 11, 2020), XP051875646, 8 pages.

3GPP TS 38.212: "3rd Generation Partnership Project; Technical Specification Group Radio Access Network; NR; Multiplexing and Channel Coding (Release 15)", 3GPP Standard; Technical Specification; 3rd Generation Partnership Project (3GPP), Mobile Competence Centre; 650, Route Des Lucioles; F-06921 Sophia-Antipolis Cedex; France, vol. RAN WG1, No. V15.7.0, Sep. 28, 2019 (Sep. 28, 2019), pp. 1-101, XP051785088, Retrieved from the Internet: URL: http://ftp.3gpp.org/Specs/archive/38_series/38.212/ 38212-f70.zip 38212-f70.docx [retrieved on Sep. 28, 2019] section 7.3.1.1—section 7.3.1.2.2, p. 72, tables 7.3.1-1.
3GPP TS 38.213: "3rd Generation Partnership Project, Technical Specification Group Radio Access Network, NR, Physical Layer Procedures for Control (Release 16)", 3GPP Standard, Technical Specification, 3GPP TS 38.213, 3rd Generation Partnership Project (3GPP), Mobile Competence Centre, 650, Route Des Lucioles, F-06921, Sophia-Antipolis, Cedex, France, vol. RAN WG1, No. V16.0.0, Dec. 2019, Jan. 14, 2020 Jan. 14, 2020), XP051860806, pp. 1-146, Retrieved from the Internet: URL: http://ftp.3gpp.org/ Specs/archive/38_series/38.213/38213-g00.zip 38213-g00.docx [retrieved on Jan. 14, 2020], section 7.6.2, Section 10, Section 10.1, p. 100, Section 10.3, Paragraph [09.1], clause 7.2.1, p. 23-p. 25, clause 9, p. 4 9, paragraph 3 clause 9.1, p. 49, paragraph 4-paragraph 15 clause 9.1.1, p. 50, paragraph 5-paragraph 6 clause 9.1.2.1, p. 55 clause 9.1.3, p. 57, paragraph 8 clause 9.1.3.1, p. 61, paragraph 1-paragraph 2 clause 9.1.3.2, p. 63, paragraph 6 clause 9.1.3.3, p. 64, paragraph 1—p. 65, paragraph 10, p. 56. paragraph 6—p. 57, paragraph 1 ch , 9.2.3, p. 73, paragraph, 5 p. 44, paragraph 8, p. 10, paragraph 1 p. 105 p. 106, tables 10.2-1. 10.2-2.
"3rd Generation Partnership Project; Technical Specification Group Radio Access Network; NR; Physical layer procedures for control (Release 16)," 3GPP Standard; Technical Specification; 3GPP TS 38.213, 3rd Generation Partnership Project (3GPP), Mobile Competence Centre, 650, Route Des Lucioles, F-06921, Sophia-Antipolis Cedex, France, vol. RAN WG1, No. V16.3.0, Oct. 2, 2020 (Oct. 2, 2020), pp. 1-179, XP051961308, Retrieved from the Internet: URL: http://ftp.3gpp.org/Specs/archive/38_series/38.213/ 38213-g30.zip 38213-g30.docx [retrieved on Oct. 2, 2020] clause 7.2.1; p. 24-p. 26 clauses 9 & 9.1; p. 49-p. 76 clause 9.2; p. 77, paragraph 1-paragraph 4, p. 81, paragraph 14-p. 82. Paragraph 1, p. 47, paragraph 3, p. 76. paragraph 7-paragraph 10.
International Search Report and Written Opinion—PCT/US2020/ 070896—ISA/EPO—dated Mar. 22, 2021.
Moderator (Huawei): "Feature Lead Summary#1 on Email Discussion 100b-e-NR-unlic-NRU-HARQ-01 (Type-3 HARQ-ACK Codebook)," 3GPP Draft, 3GPP TSG RAN WG1 Meeting #100bis, R1-2002922, 3RD Generation Partnership Project (3GPP), Mobile Competence Centre, 650, Route Des Lucioles, F-06921, Sophia-Antipolis Cedex, France, vol. RAN WG1. No. Online Meeting, Apr. 20, 2020—Apr. 30, 2020, Apr. 28, 2020 (Apr. 28, 2020), XP051878632, 35 pages, Retrieved from the Internet: URL: https://ftp.3gpp.org/ tsg_ran/WG1_RL1/TSGR1_100b_e/Docs/R1-2002922.zip R1-2002922 100b-e-NR-unlic-NRU-HARQ-01 type3CB v24 HW HW.docx [retrieved on Apr. 28, 2020] p. 15.
Qualcomm Incorporated: "TP for Enhancements to Scheduling and HARQ Operation for NR-U," 3GPP Draft, 3GPP TSG RAN WG1 Meeting #100bis-e, R1-2002532, 3RD Generation Partnership Project (3GPP), Mobile Competence Centre, 650, Route Des Lucioles, F-06921, Sophia-Antipolis Cedex, France, vol. RAN WG1. No. Online Meeting, Apr. 20, 2020—Apr. 30, 2020, Apr. 11, 2020 (Apr. 11, 2020), XP051875646, 8 pages, Retrieved from the Internet: URL: https://ftp.3gpp.org/tsg_ran/WG1_RL1/TSGR1_100b_e/Docs/ R1-2002532.zip R1-2002532 7.2.2.2.3-TP for Enhancements to Scheduling and HARQ Operation for NR-U.docx [retrieved on Apr. 11, 2020] p. 1-p. 2.

* cited by examiner

HYBRID AUTOMATIC REPEAT REQUEST ACKNOWLEDGMENT FOR DOWNLINK CONTROL INFORMATION WITHOUT PHYSICAL DOWNLINK SHARED CHANNEL SCHEDULING

CROSS-REFERENCE TO RELATED APPLICATION

This patent application claims priority to Provisional Patent Application No. 62/976,682, filed on 14 Feb. 2020, entitled "HYBRID AUTOMATIC REPEAT REQUEST ACKNOWLEDGMENT FOR DOWNLINK CONTROL INFORMATION WITHOUT PHYSICAL DOWNLINK SHARED CHANNEL SCHEDULING," and assigned to the assignee hereof. The disclosure of the prior applications is considered part of and is incorporated by reference in this patent application.

FIELD OF THE DISCLOSURE

Aspects of the present disclosure generally relate to wireless communication and to techniques and apparatuses for hybrid automatic repeat request acknowledgment for downlink control information without physical downlink shared channel scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that a downlink control information (DCI) message requests Type 3 hybrid automatic repeat request (HARQ) acknowledgment (HARQ-ACK) and does not schedule a physical downlink shared channel (PDSCH) communication; and determining, based at least in part on a PDSCH to HARQ feedback timing indicator of the DCI message, a time to transmit the Type 3 HARQ-ACK.

In some aspects, a method of wireless communication, performed by a UE, may include receiving one or more DCI messages including a request for Type 3 HARQ-ACK and an indication to perform bandwidth part switching from a first bandwidth part to a second bandwidth part; and performing one or more of: transmitting the Type 3 HARQ-ACK including a set of values for one or more downlink transmissions using the first bandwidth part, or determining to ignore the request for Type 3 HARQ-ACK based at least in part on the indication to perform bandwidth part switching.

In some aspects, a method of wireless communication, performed by a UE, may include determining that a DCI message includes a secondary cell dormancy indication and does not schedule a PDSCH communication; and determining, based at least in part on a PDSCH to HARQ feedback timing indicator of the DCI message, a time to transmit HARQ-ACK for the DCI message.

In some aspects, a UE for wireless communication may include a memory and one or more processors operatively coupled to the memory. The memory and the one or more processors may be configured to determine that a DCI message requests Type 3 HARQ-ACK and does not schedule a PDSCH communication; and determine, based at least in part on a PDSCH to HARQ feedback timing indicator of the DCI message, a time to transmit the Type 3 HARQ-ACK.

In some aspects, a UE for wireless communication may include a memory and one or more processors operatively coupled to the memory. The memory and the one or more processors may be configured to receive one or more DCI messages including a request for Type 3 HARQ-ACK and an indication to perform bandwidth part switching from a first bandwidth part to a second bandwidth part; and perform one or more of: transmit the Type 3 HARQ-ACK including a set of values for one or more downlink transmissions using the first bandwidth part, or determine to ignore the request for Type 3 HARQ-ACK based at least in part on the indication to perform bandwidth part switching.

In some aspects, a UE for wireless communication may include a memory and one or more processors operatively coupled to the memory. The memory and the one or more processors may be configured to determine that a DCI message includes a secondary cell dormancy indication and does not schedule a PDSCH communication; and determine, based at least in part on a PDSCH to HARQ feedback timing indicator of the DCI message, a time to transmit HARQ-ACK for the DCI message.

In some aspects, a non-transitory computer-readable medium may store one or more instructions for wireless communication. The one or more instructions, when executed by one or more processors of a UE, may cause the one or more processors to determine that a DCI message requests Type 3 HARQ-ACK and does not schedule a PDSCH communication; and determine, based at least in part on a PDSCH to HARQ feedback timing indicator of the DCI message, a time to transmit the Type 3 HARQ-ACK.

In some aspects, a non-transitory computer-readable medium may store one or more instructions for wireless communication. The one or more instructions, when executed by one or more processors of a UE, may cause the one or more processors to receive one or more DCI messages including a request for Type 3 HARQ-ACK and an indication to perform bandwidth part switching from a first bandwidth part to a second bandwidth part; and perform one or more of: transmit the Type 3 HARQ-ACK including a set of values for one or more downlink transmissions using the first bandwidth part, or determine to ignore the request for Type 3 HARQ-ACK based at least in part on the indication to perform bandwidth part switching.

In some aspects, a non-transitory computer-readable medium may store one or more instructions for wireless communication. The one or more instructions, when executed by one or more processors of a UE, may cause the one or more processors to determine that a DCI message includes a secondary cell dormancy indication and does not schedule a PDSCH communication; and determine, based at least in part on a PDSCH to HARQ feedback timing indicator of the DCI message, a time to transmit HARQ-ACK for the DCI message.

In some aspects, an apparatus for wireless communication may include means for determining that a DCI message requests Type 3 HARQ-ACK and does not schedule a PDSCH communication; and means for determining, based at least in part on a PDSCH to HARQ feedback timing indicator of the DCI message, a time to transmit the Type 3 HARQ-ACK.

In some aspects, an apparatus for wireless communication may include means for receiving one or more DCI messages including a request for Type 3 HARQ-ACK and an indication to perform bandwidth part switching from a first bandwidth part to a second bandwidth part; and means for performing one or more of: means for transmitting the Type 3 HARQ-ACK including a set of values for one or more downlink transmissions using the first bandwidth part, or means for determining to ignore the request for Type 3 HARQ-ACK based at least in part on the indication to perform bandwidth part switching.

In some aspects, an apparatus for wireless communication may include means for determining that a DCI message includes a secondary cell dormancy indication and does not schedule a PDSCH communication; and means for determining, based at least in part on a PDSCH to HARQ feedback timing indicator of the DCI message, a time to transmit HARQ-ACK for the DCI message.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
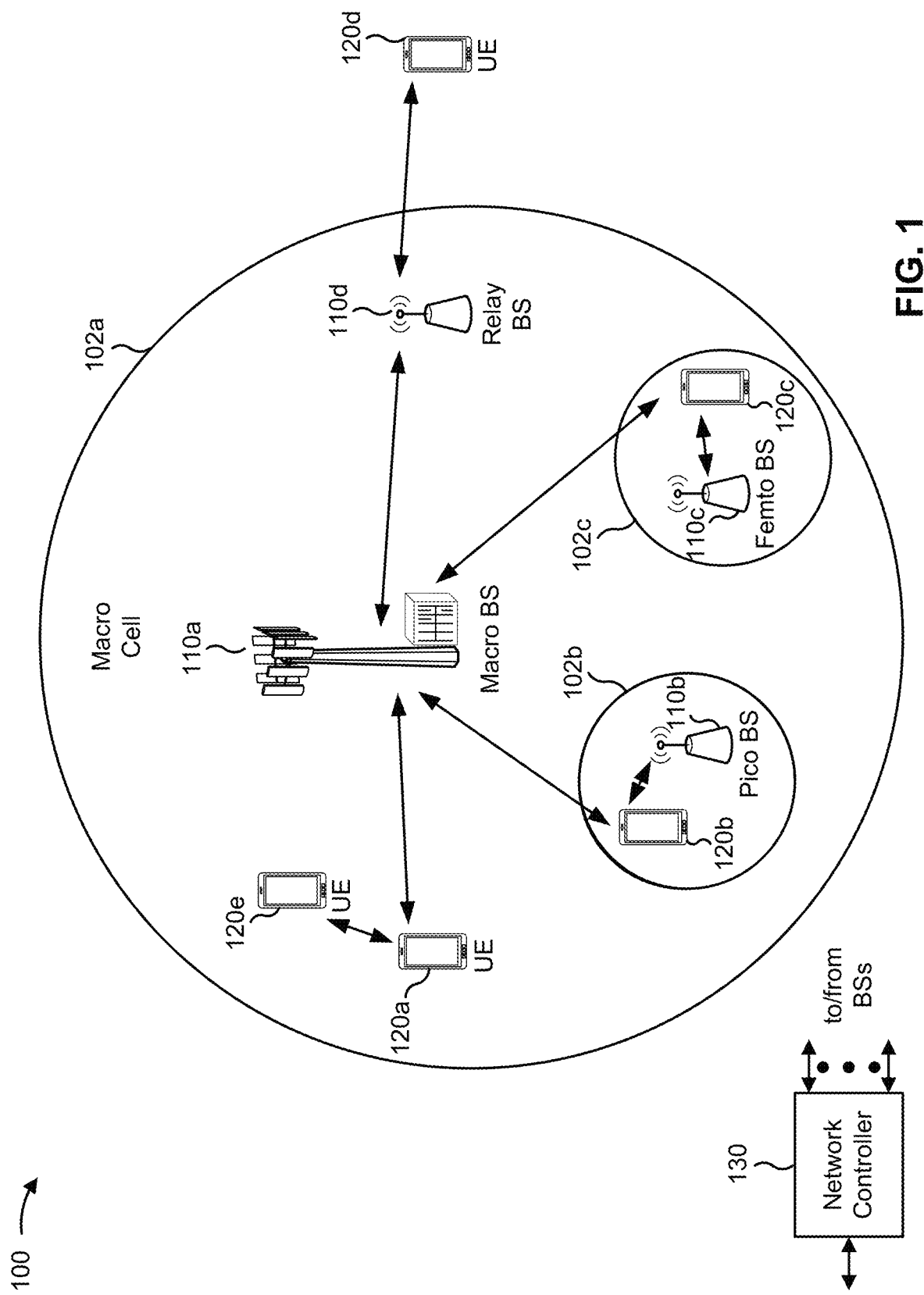
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
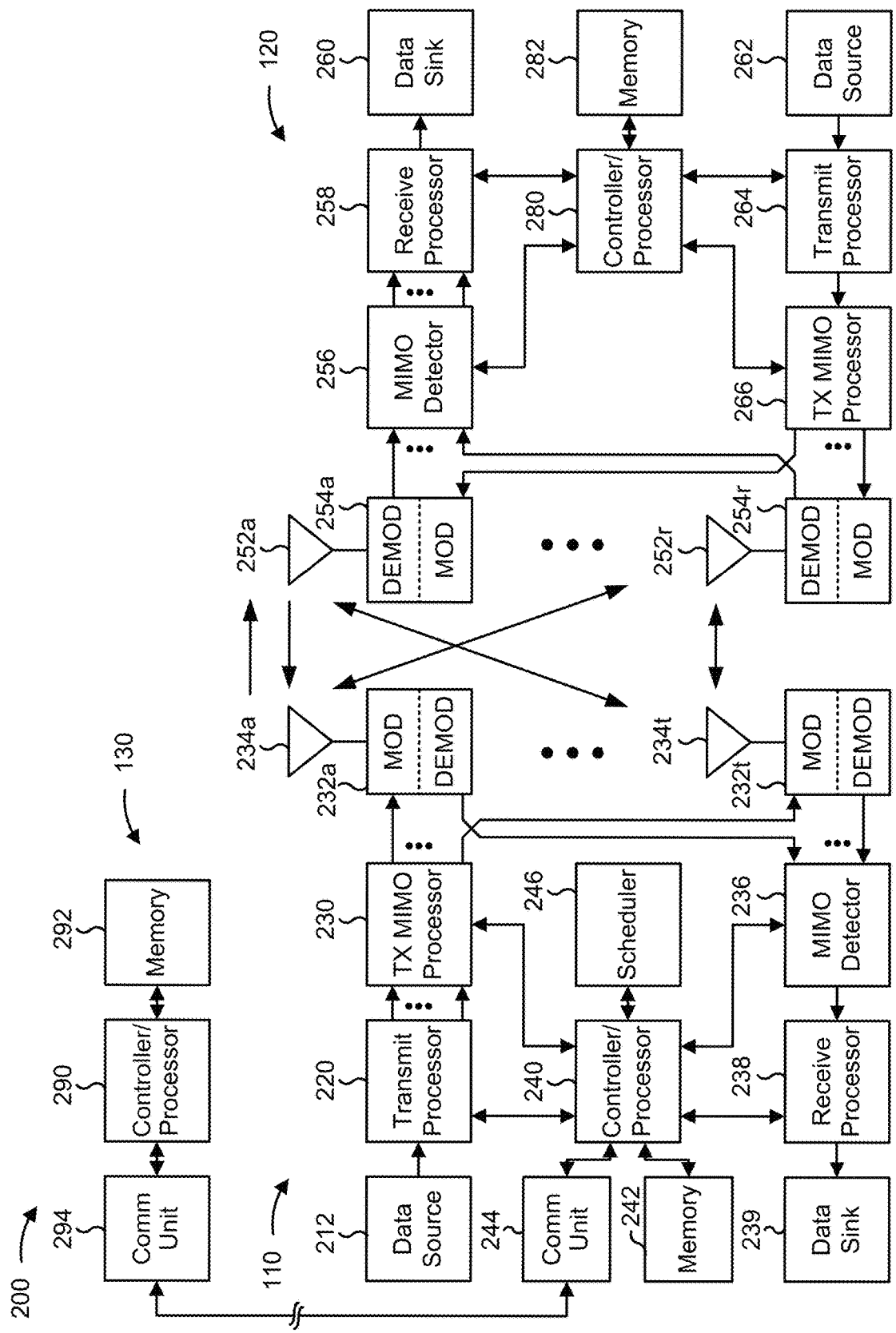
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with HARQ-ACK for DCI without PDSCH scheduling, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 1100 of FIG. 11, process 1200 of FIG. 12, process 1300 of FIG. 13, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for determining that a DCI message requests Type 3 HARQ-ACK and does not schedule a PDSCH communication; means for determining, based at least in part on a PDSCH to HARQ feedback timing indicator of the DCI message, a time to transmit the Type 3 HARQ-ACK; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for receiving one or more DCI messages including a request for Type 3 HARQ-ACK and an indication to perform bandwidth part switching from a first bandwidth part to a second bandwidth part; means for performing one or more of transmitting the Type 3 HARQ-ACK including a set of values for one or more downlink transmissions using the first bandwidth part, or determining to ignore the request for Type 3 HARQ-ACK based at least in part on the indication to perform bandwidth part switching; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for determining that a DCI message includes a secondary cell dormancy indication and does not schedule a PDSCH communication; means for determining, based at least in part on a PDSCH to HARQ feedback timing indicator of the DCI message, a time to transmit HARQ-ACK for the DCI message; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Some DCI messages may include one or more fields with instructions for receiving a PDSCH communication and providing HARQ feedback for the PDSCH communication. Some DCI messages may provide a request for HARQ feedback for multiple PDSCH communications and may optionally schedule a PDSCH for a UE to receive the PDSCH communication. A DCI message may include a request for Type 3 HARQ-ACK that may indicate that the UE is to transmit HARQ-ACK feedback for all configured HARQ processes for all component carriers over which the UE communicates with a network. A DCI message may include an indication to perform bandwidth part switching. Bandwidth part switching may include switching from using a first bandwidth part for communicating with the base station to using a second bandwidth part for future communications with the base station. This may require the UE to modify one or more components of the UE to prepare to communicate via the second bandwidth part. A DCI message may include a secondary cell dormancy indication. The secondary cell dormancy indication may indicate that the UE is to change a state of the secondary cell from an active state (e.g., for active communications) to a dormant state (e.g., a state in which the UE may monitor the secondary cell and/or not actively transmit or receive application-type data (e.g., via a PDSCH or physical uplink shared channel)).

In some instances, a base station may transmit a DCI message to request Type 3 HARQ-ACK and may not have a PDSCH communication buffered for transmission to the UE, or may not have available HARQ processes to use for scheduling a PDSCH, based at least in part on all HARQ processes being occupied and/or pending due to pending HARQ-ACK feedback that has not yet been received by the base station. In these instances, the base station may transmit the DCI message to request Type 3 HARQ-ACK without scheduling a PDSCH communication. However, the UE may be configured to transmit HARQ feedback at a time that is based at least in part on a PDSCH scheduled by a DCI message that includes a request for the HARQ feedback. Based at least in part on the configuration of the UE, the UE may be unable to determine a time to transmit the Type 3 HARQ-ACK. This may cause one or more communication errors between the base station and the UE, which may consume computing, communication, and/or network resources to detect and/or correct.

In some instances, a base station may transmit a DCI message with a secondary cell dormancy indication without scheduling a PDSCH communication. Based at least in part on a UE being configured to transmit HARQ feedback at a time that is based at least in part on a PDSCH scheduled by a DCI message, the UE may be unable to determine a time to transmit HARQ feedback to acknowledge receipt of the DCI message. This may cause the base station to be unaware of whether the UE received the secondary cell dormancy indication. Based at least in part on the base station being unaware of whether the UE received the secondary cell dormancy indication, the base station may make an assumption of successful receipt, and the UE and base station may become unsynchronized. This may cause one or more errors in communications between the base station and the UE, which may consume computing, communication, and/or network resources to detect and/or correct.

In some instances, a base station may transmit a DCI message with an indication that the UE is to perform bandwidth part switching and a DCI message requesting a Type 3 HARQ-ACK after performing the bandwidth part switching. A UE may be configured to not transmit HARQ-ACK if the UE performs bandwidth part switching between a time of reception of a DCI scheduling the HARQ-ACK and a time scheduled for the HARQ-ACK. When the DCI message requests a HARQ-ACK codebook (e.g., with HARQ-ACK for multiple PDSCH communications), the UE may exclude feedback on any PDSCH communications received before performing bandwidth part switching. However, a request for Type 3 HARQ-ACK may request HARQ feedback for one or more (e.g., all) configured HARQ processes for one or more (e.g., all) component carriers over which the UE communicates with a network, including HARQ processes associated with PDSCH communications received before the bandwidth switching. In this way, the Type 3 HARQ-ACK request may conflict with a UE configuration regarding transmitting HARQ feedback for PDSCH communications received before performing bandwidth part switching. The UE may determine that an error has occurred, based at least in part on the conflict. The UE and/or the base station may use computing, communication, and/or network resources to detect and/or recover from the determined error.

In some aspects described herein, a UE (e.g., UE 120) may receive a DCI message that requests Type 3 HARQ-ACK and does not schedule a PDSCH communication. The UE may determine a time to transmit the Type 3 HARQ-ACK based at least in part on a PDSCH to HARQ feedback timing indicator of the DCI message (e.g., in a K1 field of the DCI message). In some aspects, the UE may determine the time to transmit the Type 3 HARQ-ACK based at least in part on a reference time (e.g., a slot or sub-slot in which the DCI message was received, a slot indicated by a value of a time domain resource allocation (TDRA) field of the DCI, and/or the like) and an amount of time indicated by the PDSCH to HARQ feedback timing indicator of the DCI message. In this way, the UE may be able to determine a time to transmit the Type 3 HARQ-ACK. This may conserve computing, communication, and/or network resources that may have otherwise been used to detect and/or correct one or more communication errors between the base station and the UE caused by the UE being unable to determine a time to transmit the Type 3 HARQ-ACK.

In some aspects describe herein, a UE (e.g., UE 120) may receive a DCI message that includes a secondary cell dormancy indication and does not schedule a PDSCH communication. The UE may determine a time to transmit HARQ feedback based at least in part on a PDSCH to HARQ feedback timing indicator of the DCI message (e.g., in a K1 field of the DCI message). In some aspects, the UE may determine the time to transmit the HARQ feedback based at least in part on a reference time (e.g., a slot or sub-slot in which the DCI message was received, a slot indicated by a value of a TDRA field of the DCI, and/or the like) and an amount of time indicated by the PDSCH to HARQ feedback timing indicator of the DCI message. In this way, the UE may be able to determine a time to transmit the HARQ feedback. This may conserve computing, communication, and/or network resources that may have otherwise been used to detect and/or correct one or more communication errors between the base station and the UE as a result of the UE being unable to determine a time to transmit the HARQ feedback.

In some aspects described herein, the UE may receive a DCI message with an indication that the UE is to perform bandwidth part switching from a first bandwidth part to a second bandwidth part. The UE may also receive a DCI message requesting that the UE transmit a Type 3 HARQ-ACK after the UE performs the bandwidth part switching. The UE may transmit the Type 3 HARQ-ACK including a set of values for one or more downlink transmissions using the first bandwidth part and/or a set of values for one or more downlink transmissions using the second bandwidth part. In some aspects, the set of values for the one or more downlink transmissions using the first bandwidth part may be based at least in part on decoding results of the one or more downlink transmissions using the first bandwidth part. In some aspects, the set of values for the one or more downlink transmissions using the first bandwidth part may be independent from decoding results of the one or more downlink transmissions using the first bandwidth part. In this way, the UE may provide the Type 3 HARQ-ACK including values for the one or more downlink transmissions using the first bandwidth part even after the UE performs the bandwidth part switching. In this way, the UE may avoid determining that an error has occurred, which may conserve computing, communication, and/or network resources that may otherwise have been used to detect and/or recover from the determined error.

Figure 3:
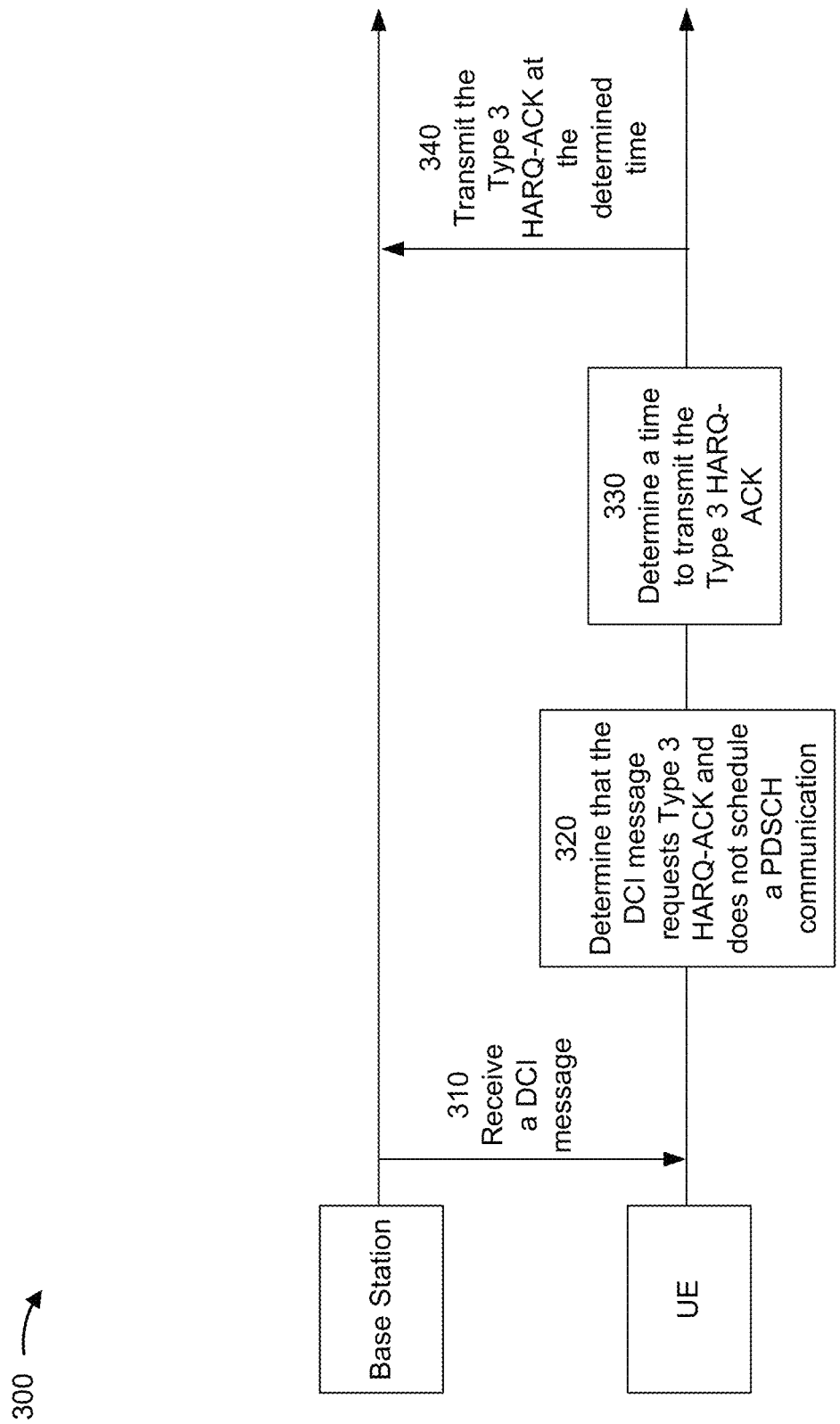
FIG. 3 is a diagram illustrating an example of transmitting Type 3 HARQ-ACK, in accordance with various aspects of the present disclosure.

FIG. 3 is a diagram illustrating an example 300 of transmitting Type 3 HARQ-ACK, in accordance with various aspects of the present disclosure. As shown, a UE (e.g., UE 120) and a base station (e.g., base station 110) communicate using one or more of a DCI message and transmission of Type 3 HARQ-ACK (e.g., via a physical uplink control channel (PUCCH) communication), and/or the like. In some aspects, the base station and the UE may be part of a wireless network (e.g., the wireless network 100).

As shown in FIG. 3, and by reference number 310, the UE may receive a DCI message from the base station. In some aspects, the DCI message may include a DCI format 1_1 message.

In some aspects, the DCI message may include a one-shot HARQ-ACK (also referred to as a Type 3 HARQ-ACK) request field. In some aspects, the one-shot HARQ-ACK request field may include a single bit to indicate whether the DCI requests a one-shot HARQ-ACK. In some aspects, a one-shot HARQ-ACK (e.g., Type 3 HARQ-ACK) request may indicate that the UE is to transmit HARQ-ACK feedback for one or more (e.g., multiple and/or all) configured HARQ processes for one or more (e.g., multiple and/or all) component carriers over which the UE communicates with a network. In some aspects, a value of 0 may indicate that one-shot HARQ-ACK is not requested and a value of 1 may indicate that one-shot HARQ-ACK is requested. In some aspects, the UE may be configured for one-shot HARQ-ACK (e.g., pdsch-HARQ-ACK-OneShotFeedback-r16)

using radio resource control (RRC) signaling to perform one-shot HARQ-ACK feedback. In some aspects, the HARQ-ACK feedback may include code block group based HARQ-ACK feedback or transport block based HARQ-ACK feedback.

In some aspects, the DCI message may include a frequency domain resource allocation (FDRA) field. The FDRA field may indicate a resource allocation (e.g., for a PDSCH communication) in the frequency domain. In some aspects, the FDRA field may have a number of bits that are based at least in part on whether a UE is configured with a resource allocation Type 0, a resource allocation Type 1, or both of the resource allocation Type 0 and the resource allocation Type 1. If both of the resource allocation Type 0 and the resource allocation Type 1 are configured, a most significant bit (e.g., an added bit of the FDRA field) may be used to indicate which of the resource allocation Type 0 and the resource allocation Type 1 are used by the DCI message. When the resource allocation Type 0 or the resource allocation Type 1 are used, a set of least significant bits may indicate the resource allocation.

In some aspects, resource allocation Type 0 may use a resource block group (RBG) based bitmap to allocate resources for a downlink transmission (e.g., using a PDSCH). If resource allocation Type 0 is configured, a value of all zeros for the FDRA field may be an invalid FDRA value for assigning RBGs for a downlink transmission, and may indicate that no PDSCH communication is scheduled.

In some aspects, resource allocation Type 1 may use a resource index value based bitmap, which indicates a starting resource block and a number of resource blocks for a downlink transmission. If resource allocation Type 1 is configured, a value of all ones for the FDRA field may be an invalid FDRA value for assigning resource blocks for a downlink transmission, and may indicate that no PDSCH communication is scheduled.

In some aspects, when both of the resource allocation Type 0 and the resource allocation Type 1 are configured, a value of all zeros for the FDRA field and a value of all ones may be invalid FDRA values for assigning resource blocks for a downlink transmission, and may indicate that no PDSCH communication is scheduled.

In some aspects, the DCI may include a TDRA field. The TDRA field may indicate a resource allocation (e.g., for a PDSCH communication) in the time domain. The TDRA may identify the resource allocation based at least in part on a frame index, a subframe index, a slot index, a sub-slot index, and/or the like.

In some aspects, the DCI may include a K1 field (also referred to as a PDSCH-to-HARQ feedback timing indicator field). The K1 field may indicate a time (e.g., a number of slots or sub-slots) that the UE is to wait after receiving a scheduled PDSCH communication before transmitting HARQ feedback.

As shown by reference number 320, the UE may determine that the DCI message requests Type 3 HARQ-ACK and does not schedule a PDSCH communication. In some aspects, the UE may determine that the DCI message requests Type 3 HARQ-ACK based at least in part on an indication (e.g., a value of 1) in the one-shot HARQ-ACK request field. In some aspects, the UE may determine that the DCI message does not schedule a PDSCH communication based at least in part on a value of an FDRA field of the DCI. For example, the UE may determine that the DCI message does not schedule a PDSCH communication based at least in part on the value of the FDRA field of the DCI being all zeros if resource allocation Type 0 is configured, all ones if resource allocation Type 1 is configured, or all ones or all zeros if both resource allocation Type 0 and resource allocation Type 1 are configured.

As shown by reference number 330, the UE may determine a time to transmit the Type 3 HARQ-ACK. In some aspects, the UE may determine the time to transmit the Type 3 HARQ-ACK based at least in part on a PDSCH to HARQ feedback timing indicator of the DCI message (e.g., in the K1 field of the DCI message). In some aspects, the UE may determine the time to transmit the Type 3 HARQ-ACK based at least in part on a reference time (e.g., a time associated with another event and/or an indicated time) and/or the PDSCH to HARQ feedback timing indicator. For example, the UE may determine that the time to transmit the Type 3 HARQ-ACK occurs after an amount of time (e.g., as indicated by the PDSCH to HARQ feedback timing indicator) after the reference time (e.g., a time at which the UE receives the DCI message, a time indicated in the TDRA field, and/or the like).

As shown by reference number 340, the UE may transmit the Type 3 HARQ-ACK at the determined time. In some aspects, the UE may transmit the Type 3 HARQ-ACK via a PUCCH communication.

As indicated above, FIG. 3 is provided as an example. Other examples may differ from what is described with respect to FIG. 3.

Figure 4A:
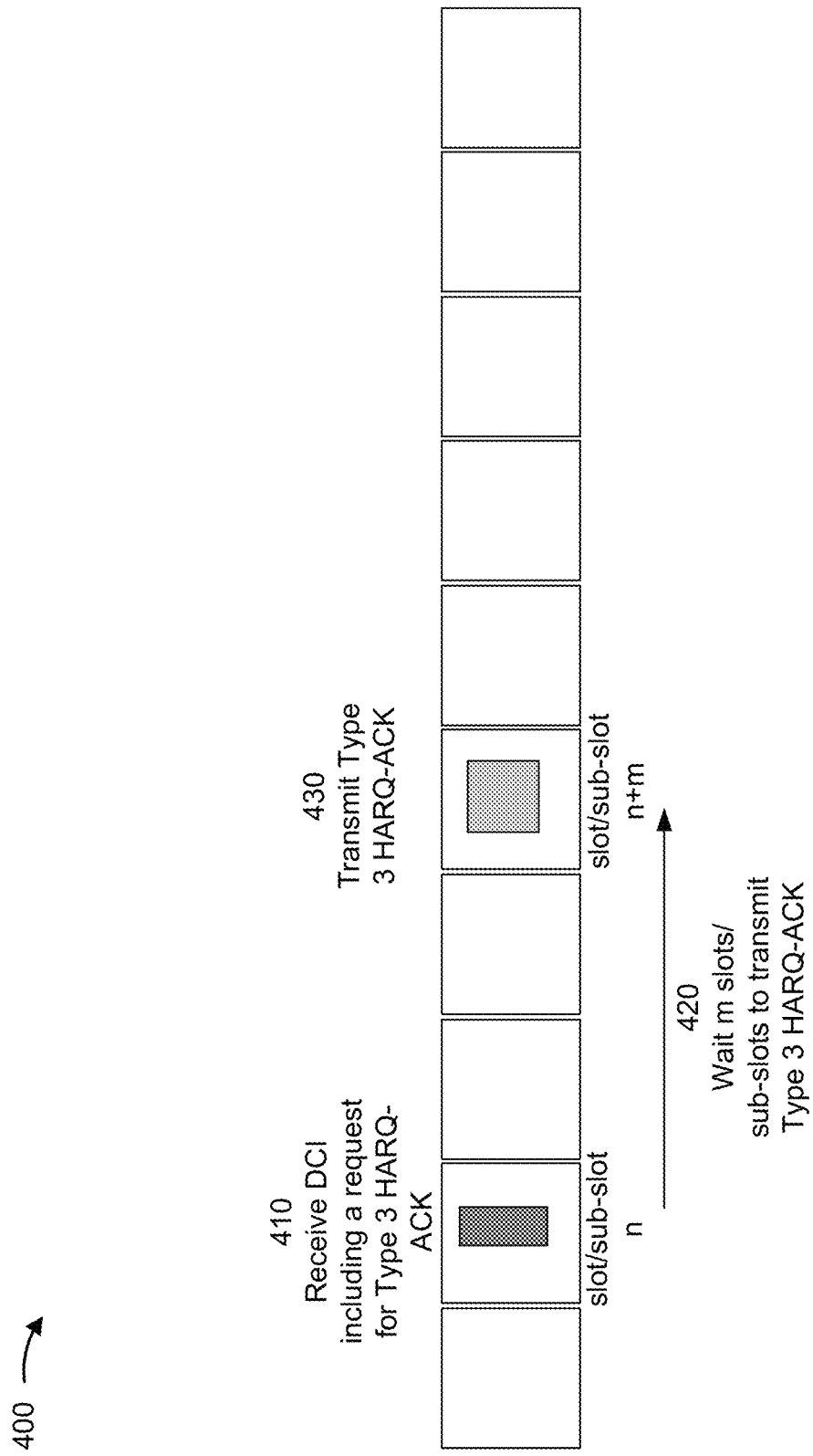
FIG. 4A is a diagram illustrating an example of transmitting Type 3 HARQ-ACK, in accordance with various aspects of the present disclosure.

FIG. 4A is a diagram illustrating an example 400 of transmitting Type 3 HARQ-ACK, in accordance with various aspects of the present disclosure.

As shown in FIG. 4A, and by reference number 410, the UE may receive a DCI message including a request for Type 3 HARQ-ACK. The UE may receive the DCI message via a physical downlink control channel (PDCCH) during a slot and/or sub-slot n. The DCI message may indicate (e.g., via a PDSCH to HARQ feedback timing indicator) an amount of time that the UE is to wait before transmitting the Type 3 HARQ-ACK. In some aspects, the UE may be configured (e.g., via RRC signaling) to use a time (e.g., slot and/or sub-slot n) of reception of the DCI message as a reference time from which the UE determines the time to transmit the Type 3 HARQ-ACK. For example, the UE may determine that the time to transmit the Type 3 HARQ-ACK is m slots and/or sub-slots after receiving the DCI message.

As shown by reference number 420, the UE may wait m slots and/or sub-slots to transmit the Type 3 HARQ-ACK. In some aspects, the UE may determine the number m of slots and/or sub-slots to wait based at least in part on a value of a PDSCH to HARQ feedback timing indicator field of the DCI message.

As shown by reference number 430, the UE may transmit the Type 3 HARQ-ACK during a slot and/or sub-slot n+m. In some aspects, the UE may transmit the Type 3 HARQ-ACK via a PUCCH.

As indicated above, FIG. 4A is provided as an example. Other examples may differ from what is described with respect to FIG. 4A.

Figure 4B:
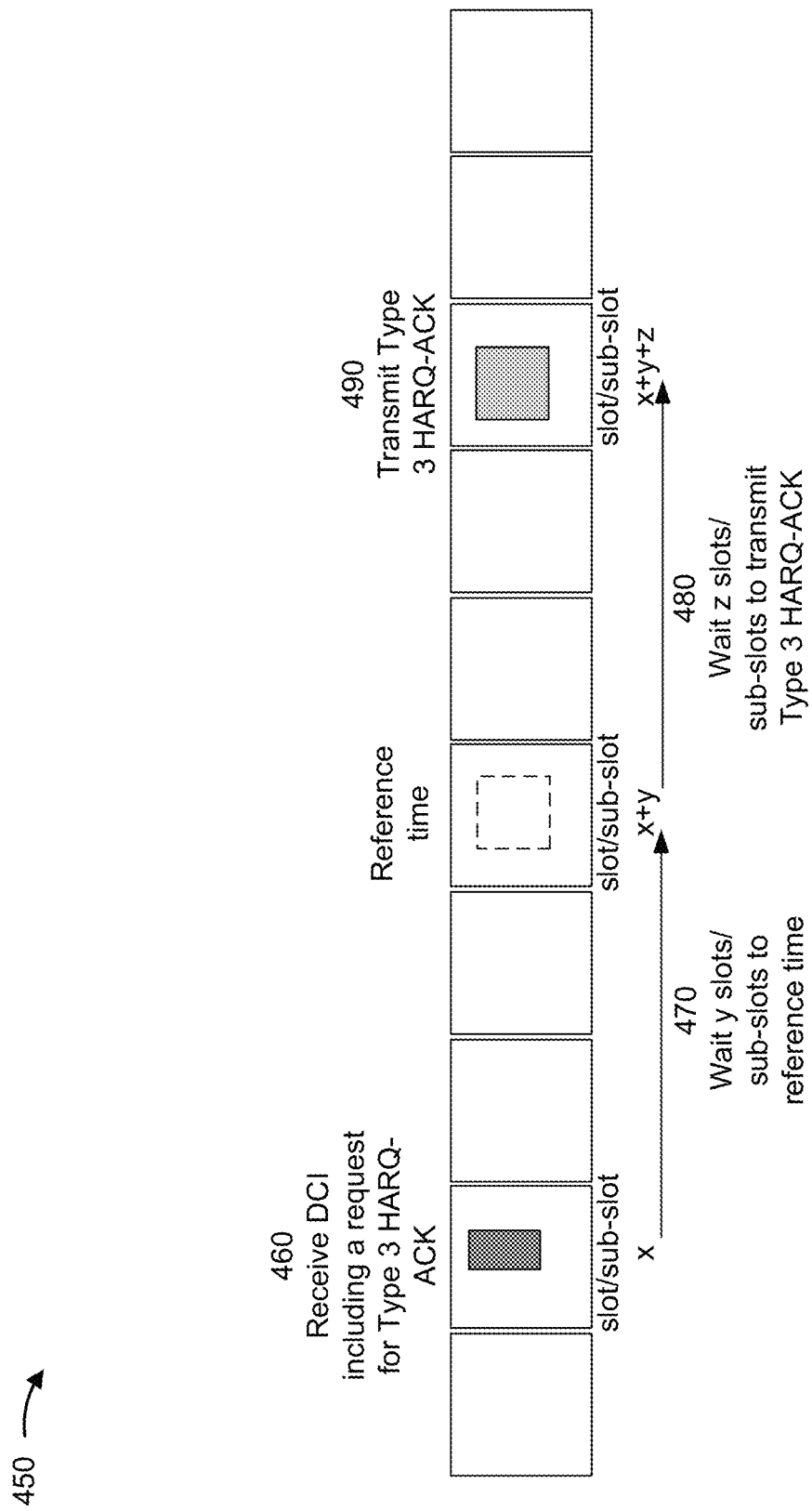
FIG. 4B is a diagram illustrating an example of transmitting Type 3 HARQ-ACK, in accordance with various aspects of the present disclosure.

FIG. 4B is a diagram illustrating an example 450 of transmitting Type 3 HARQ-ACK, in accordance with various aspects of the present disclosure.

As shown in FIG. 4B, and by reference number 460, the UE may receive a DCI message including a request for Type 3 HARQ-ACK. The UE may receive the DCI message via a PDCCH during a slot and/or sub-slot x. The DCI message may indicate (e.g., via a PDSCH to HARQ feedback timing indicator) an amount of time that the UE is to wait after a reference time before transmitting the Type 3 HARQ-ACK.

The DCI message may indicate the reference time as a slot or sub-slot indicated by a value of a TDRA field of the DCI message.

As shown by reference number 470, the UE may determine to wait y slots and/or sub-slots to the reference time x+y. In some aspects, the UE may determine that the TDRA field (e.g., using a K0 value) identifies slot and/or sub-slot x+y as a reference time, where y is an amount of time from reception of the DCI message to a hypothetical PDSCH communication. In some aspects, the TDRA field may explicitly identify the reference time (e.g., using a slot and/or sub-slot index). In some aspects, the UE may determine that no PDSCH is scheduled based at least in part on a value of the FDRA field and may determine the reference time based at least in part on a value of the TDRA when the hypothetical PDSCH communication is not scheduled.

In some aspects, the UE may be configured (RRC signaling) to use a time (e.g., slot and/or sub-slot x+y) indicated by a TDRA field of the DCI message as a reference time from which the UE determines the time to transmit the Type 3 HARQ-ACK.

As shown by reference number 480, the UE may wait z slots and/or sub-slots from the reference slot and/or sub-slot x+z to transmit the Type 3 HARQ-ACK. In some aspects, the UE may determine the value of z from a PDSCH to HARQ feedback timing indicator or other indication in the DCI message. Based at least in part on values of y and z, the UE may determine a time to transmit the Type 3 HARQ-ACK. For example, the UE may determine that the time to transmit the Type 3 HARQ-ACK is y+z slots and/or sub-slots after receiving the DCI message at time x.

As shown by reference number 490, the UE may transmit the Type 3 HARQ-ACK during a slot and/or sub-slot x+y+z. In some aspects, the UE may transmit the HARQ-ACK via a PUCCH.

As indicated above, FIG. 4B is provided as an example. Other examples may differ from what is described with respect to FIG. 4B.

Figure 5:
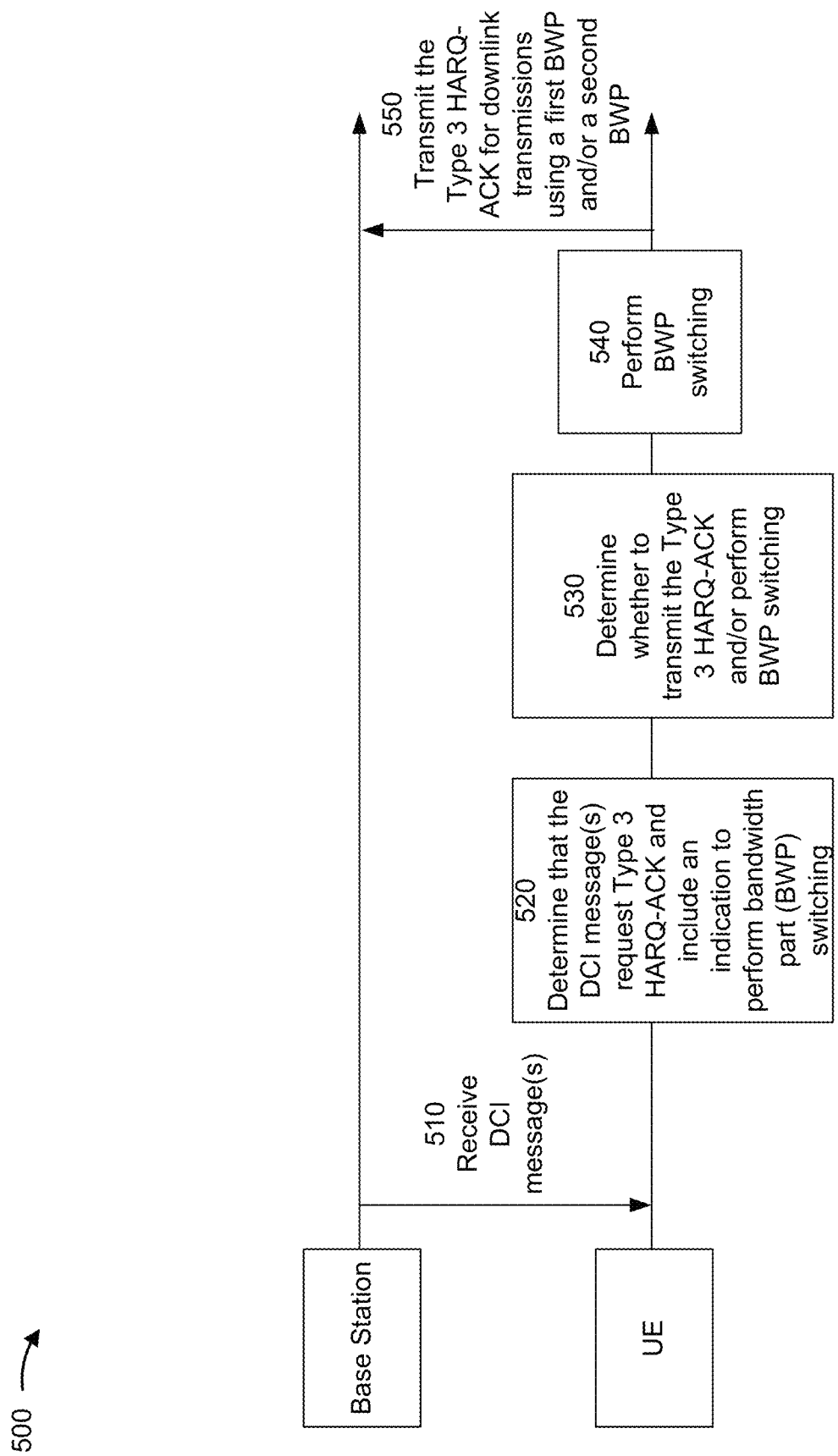
FIG. 5 is a diagram illustrating an example of transmitting Type 3 HARQ-ACK and/or performing bandwidth part switching, in accordance with various aspects of the present disclosure.

FIG. 5 is a diagram illustrating an example 500 of transmitting Type 3 HARQ-ACK and/or performing bandwidth part switching, in accordance with various aspects of the present disclosure.

As shown in FIG. 5, and by reference number 510, the UE may receive one or more DCI messages from the base station (e.g., via one or more PDCCHs). In some aspects, the DCI message may include a DCI format 1_1 message. The one or more DCI messages may be used to schedule one or more PDSCH communications, to request Type 3 HARQ-ACK, to indicate to perform bandwidth part switching, and/or the like.

As shown by reference number 520, the UE may determine that the one or more DCI messages include a request for Type 3 HARQ-ACK and an indication to perform bandwidth part switching from a first bandwidth part to a second bandwidth part. In some aspects, the request for Type 3 HARQ-ACK may be received in a DCI message that is before, after, or the same as a DCI message that includes the indication to perform bandwidth part switching.

As shown by reference number 530, the UE may determine whether to transmit the Type 3 HARQ-ACK and/or whether to perform the bandwidth part switching. In some aspects, if the UE receives the request for Type 3 HARQ-ACK and the indication to perform bandwidth part switching in a single DCI message, the UE may determine whether to transmit the Type 3 HARQ-ACK and to perform the bandwidth part switching, to ignore the request for Type 3 HARQ-ACK and to perform the bandwidth part switching, to transmit the Type 3 HARQ-ACK and to perform the bandwidth part switching, or to determine that the DCI message is in error.

In some aspects, the UE may determine to ignore an indicator for bandwidth part switching (e.g., a bandwidth part (BWP) indicator field) in the DCI message based at least in part on the DCI message requesting the Type 3 HARQ-ACK. In some aspects, the UE may determine to ignore an indicator requesting the Type 3 HARQ-ACK based at least in part on an indication for bandwidth part switching. In some aspects, the UE may determine that the DCI message is in error, and to ignore an indicator requesting the Type 3 HARQ-ACK and an indicator for bandwidth part switching. In some aspects, the determination may be further based at least in part on a configuration of the UE (e.g., based at least in part on RRC signaling) that indicates what action the UE is to take when the UE receives a DCI message with a request for Type 3 HARQ-ACK and an indication to perform bandwidth part switching in a single DCI message.

In some aspects, the UE may determine whether to transmit the Type 3 HARQ-ACK and/or whether to perform the bandwidth part switching when both are indicated in a same DCI message based at least in part on whether the DCI message schedules a PDSCH communication. For example, based at least in part on the DCI message not scheduling a PDSCH communication, the UE may determine to ignore an indicator for bandwidth part switching in the DCI message based at least in part on the DCI message requesting the Type 3 HARQ-ACK, ignore an indicator requesting the Type 3 HARQ-ACK based at least in part on an indication for bandwidth part switching, or ignore an indicator requesting the Type 3 HARQ-ACK and an indicator for bandwidth part switching. In some aspects, the determination may be further based at least in part on a configuration of the UE (e.g., based at least in part on RRC signaling) that indicates what action the UE is to take when the UE receives a DCI message with a request for Type 3 HARQ-ACK and an indication to perform bandwidth part switching in a single DCI message that does not schedule a PDSCH communication.

As shown by reference number 540, the UE may perform bandwidth part switching. In other words, the UE communicating using a component carrier in a first bandwidth part may prepare for, and begin to use, a second bandwidth part for future communications. This may require the UE to modify one or more components of the UE to prepare to communicate via the second bandwidth part.

As shown by reference number 550, the UE may transmit the Type 3 HARQ-ACK for one or more downlink transmissions using the first bandwidth part and/or one or more downlink transmissions using the second bandwidth part. In some aspects, the UE may transmit a set of values for the one or more downlink transmissions using the first bandwidth part and an additional set of values for one or more downlink transmissions using the second bandwidth part. In some aspects, the set of values for the one or more transmissions using the first bandwidth part may be based at least in part on decoding results of the one or more downlink transmissions using the first bandwidth part. In some aspects, the set of values for the one or more transmissions using the first bandwidth part may be independent from decoding results of the one or more downlink transmissions using the first bandwidth part. For example, the set of values for the one or more transmissions using the first bandwidth part may all indicate negative acknowledgement.

In some aspects, the Type 3 HARQ-ACK for the one or more downlink transmissions using the first bandwidth part may include new data indicator (NDI) values corresponding to the one or more downlink transmissions using the first bandwidth part. In some aspects, the NDI values may be based at least in part on actual NDI values associated with one or more downlink transmissions using the first bandwidth part. In some aspects, the NDI values may be set to a default NDI value (e.g., 0 (zero)).

In some aspects, the UE may be configured to transmit code-block group (CBG) based acknowledgements or negative acknowledgements for CBGs of the first bandwidth part as part of Type 3 HARQ-ACK. In some aspects, the Type 3 HARQ-ACK may include a negative acknowledgement (NACK) for each of the CBGs of the one or more downlink transmissions using the first bandwidth part.

As indicated above, FIG. 5 is provided as an example. Other examples may differ from what is described with respect to FIG. 5.

Figure 6:
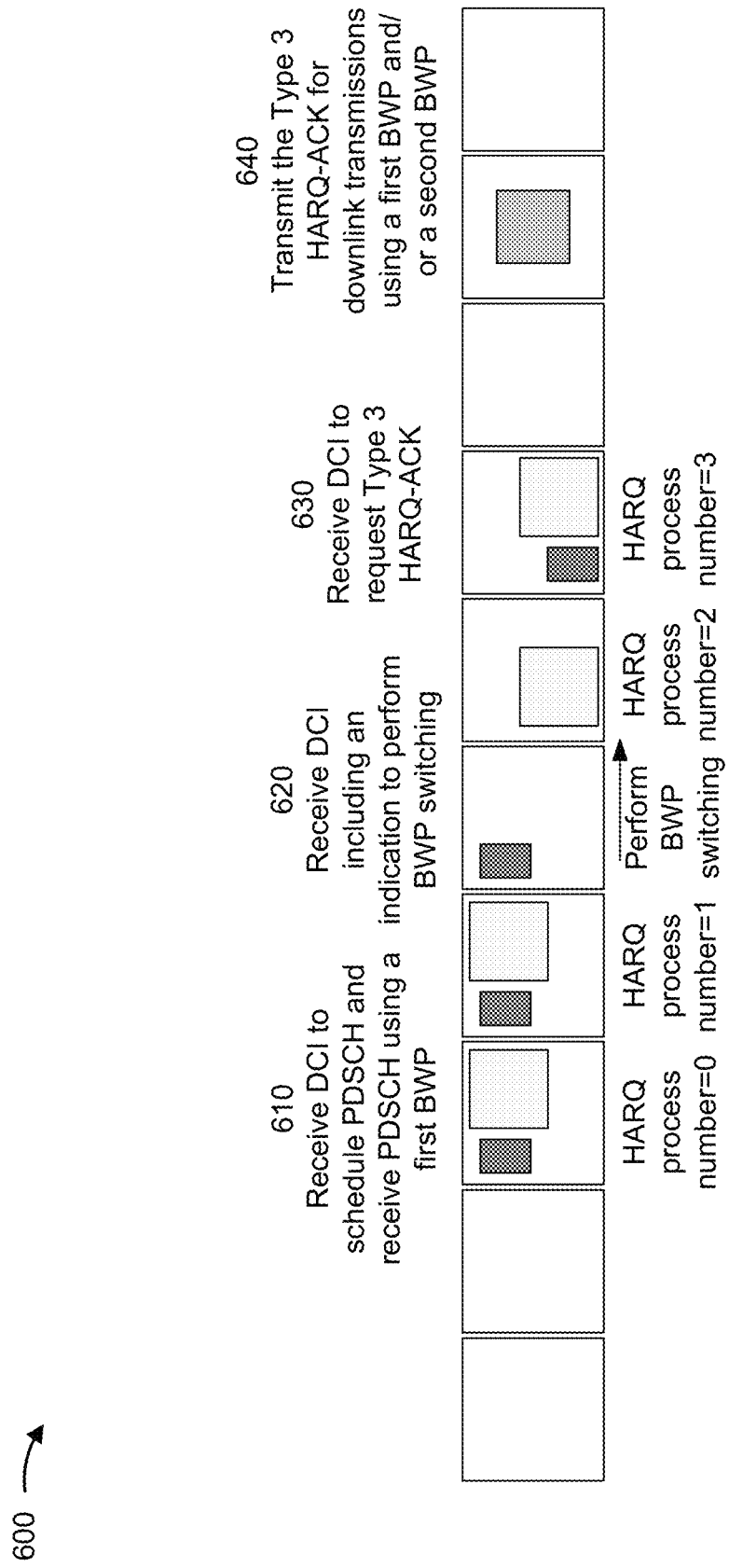
FIG. 6 is a diagram illustrating an example of transmitting Type 3 HARQ-ACK and/or performing bandwidth part switching, in accordance with various aspects of the present disclosure.

FIG. 6 is a diagram illustrating an example 600 of transmitting Type 3 HARQ-ACK and/or performing bandwidth part switching, in accordance with various aspects of the present disclosure.

As shown in FIG. 6, and by reference number 610, the UE may receive a DCI message to schedule one or more PDSCH communications using a first bandwidth part. The UE may also receive the one or more PDSCH communications using the first bandwidth part. In some aspects, the UE may store and/or buffer HARQ feedback associated with the one or more PDSCH communications (e.g., HARQ process number=0, HARQ process number=1, and/or the like).

As shown by reference number 620, the UE may receive a DCI message that includes an indication to perform bandwidth part switching. In some aspects, the UE may determine to perform the bandwidth part switching, and prepare to begin communicating via the second bandwidth part.

As shown by reference number 630, the UE may receive a DCI message to request Type 3 HARQ-ACK after performing the bandwidth part switching. In some aspects, the UE may have HARQ feedback stored and/or buffered that is associated with the one or more PDSCH communications received via the first bandwidth part (e.g., HARQ process number=0, HARQ process number=1, and/or the like). In some aspects, the UE may have HARQ feedback stored and/or buffered that is associated with one or more PDSCH communications received via the second bandwidth part (e.g., HARQ process number=2, HARQ process number=3, and/or the like).

As shown by reference number 640, the UE may transmit the Type 3 HARQ-ACK for the downlink transmissions using the first bandwidth part (e.g., HARQ process number=0, HARQ process number=1, and/or the like) and for the downlink transmissions using the second bandwidth part (e.g., HARQ process number=2, HARQ process number=3, and/or the like). In some aspects, the Type 3 HARQ-ACK includes the set of values for the one or more downlink transmissions using the first bandwidth part and an additional set of values for one or more downlink transmissions using the second bandwidth part. In some aspects, the set of values for the one or more downlink transmissions using the first bandwidth part may be based at least in part on decoding results of the one or more downlink transmissions using the first bandwidth part. For example, a Type 3 HARQ-ACK codebook may indicate a true ACK/NACK for each of the HARQ process numbers regardless of whether the associated PDSCH communications were received before or after performing bandwidth part switching (e.g., {A/N, A/N, A/N, A/N}).

In some aspects, the set of values for the one or more downlink transmissions using the first bandwidth part may be independent from decoding results of the one or more downlink transmissions using the first bandwidth part. For example, a Type 3 HARQ-ACK codebook may indicate a NACK for each of the HARQ process numbers associated with PDSCH communications received via the first bandwidth part and a true ACK/NACK for each of the HARQ process numbers associated with PDSCH communications received via the second bandwidth part (e.g., {N, N, A/N, A/N}).

As indicated above, FIG. 6 is provided as an example. Other examples may differ from what is described with respect to FIG. 6.

Figure 7:
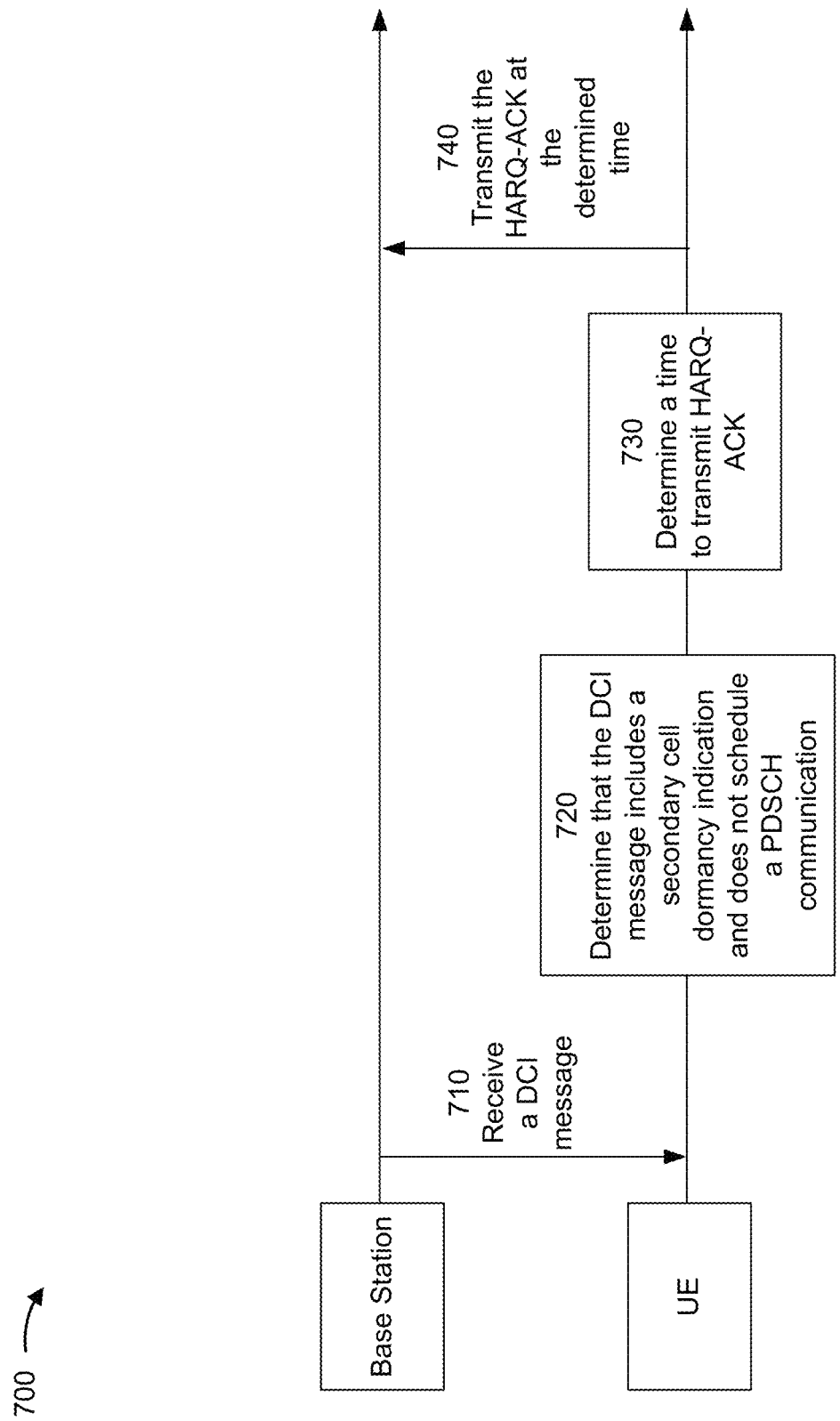
FIG. 7 is a diagram illustrating an example of transmitting HARQ-ACK for a DCI message that includes a secondary cell dormancy indication and does not schedule a PDSCH communication, in accordance with various aspects of the present disclosure.

FIG. 7 is a diagram illustrating an example 700 of transmitting HARQ-ACK for a DCI message that includes a secondary cell dormancy indication and does not schedule a PDSCH communication, in accordance with various aspects of the present disclosure.

As shown in FIG. 7, and by reference number 710, the UE may receive a DCI message. In some aspects, the DCI message may include a secondary cell dormancy indication, an FDRA field and a TDRA field to identify a resource for a PDSCH communication, a request for HARQ-ACK, and/or the like. The UE may receive the DCI message via a PDCCH.

As shown by reference number 720, the UE may determine that the DCI message includes a secondary cell dormancy indication and does not schedule a PDSCH communication. In some aspects, the UE may determine that the DCI message includes a secondary cell dormancy indication and does not schedule a PDSCH communication based at least in part on a value of an FDRA field of the DCI (e.g., as described herein). For example, the FDRA field of the DCI may indicate that no PDSCH communication is scheduled, based at least in part on the value of the FDRA field of the DCI being all zeros if resource allocation Type 0 is configured, all ones if resource allocation Type 1 is configured, or all ones or all zeros if both resource allocation Type 0 and resource allocation Type 1 are configured.

As shown by reference number 730, the UE may determine a time to transmit HARQ-ACK for the DCI message. In some aspects, the UE may determine the time to transmit the HARQ-ACK based at least in part on a PDSCH to HARQ feedback timing indicator of the DCI message (e.g., in the K1 field of the DCI message). In some aspects, the UE may determine the time to transmit the HARQ-ACK based at least in part on a reference time (e.g., a time associated with another event and/or an indicated time) and/or the PDSCH to HARQ feedback timing indicator. For example, the UE may determine that the time to transmit the HARQ-ACK occurs after an amount of time (e.g., as indicated by the PDSCH to HARQ feedback timing indicator) after the reference time (e.g., a time at which the UE receives the DCI message, a time indicated in the TDRA field, and/or the like).

As shown by reference number 740, the UE may transmit the HARQ-ACK at the determined time. In some aspects, the UE may transmit the HARQ-ACK via a PUCCH communication.

As indicated above, FIG. 7 is provided as an example. Other examples may differ from what is described with respect to FIG. 7.

Figure 8A:
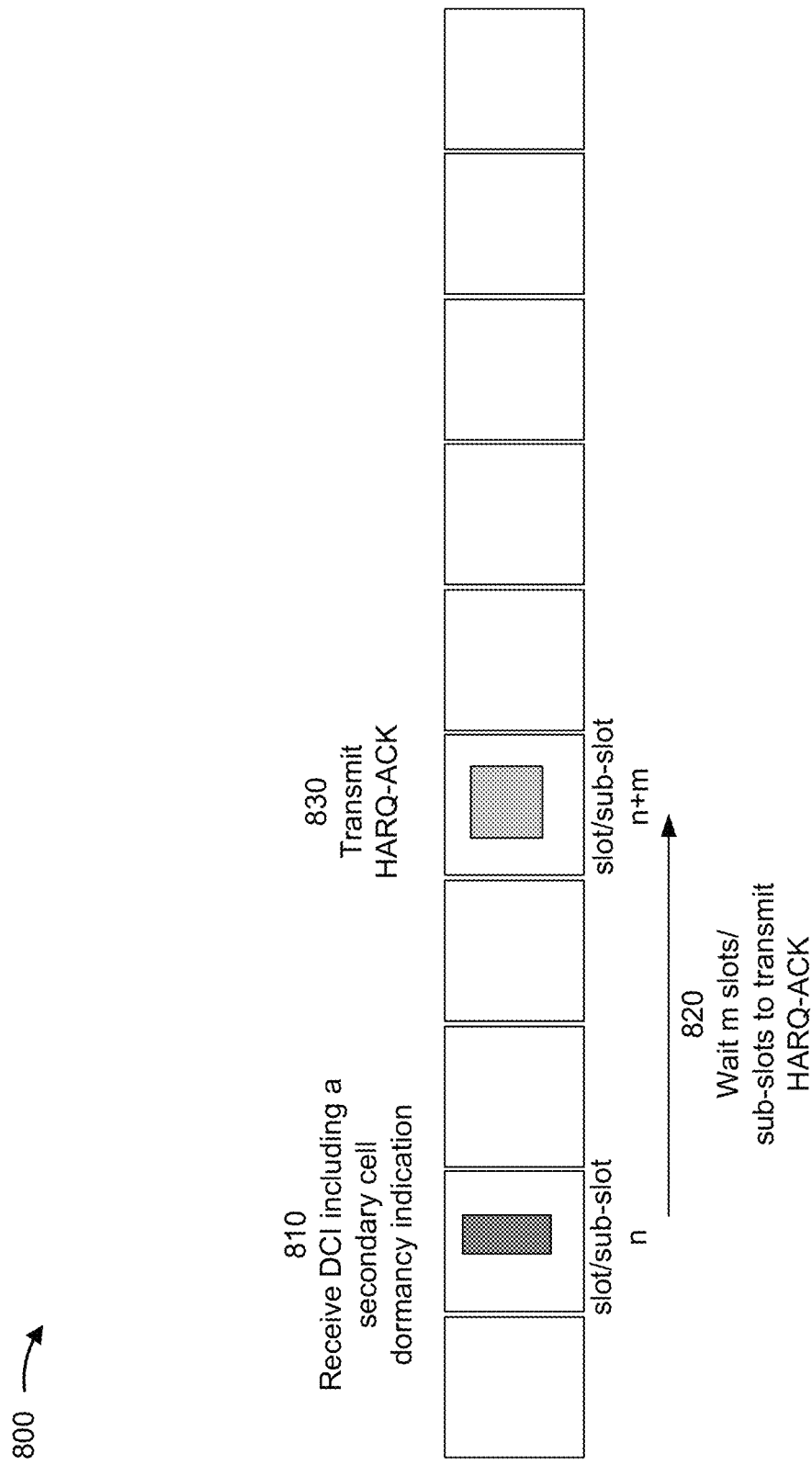
FIG. 8A is a diagram illustrating an example of transmitting HARQ-ACK for a DCI message that includes a secondary cell dormancy indication and does not schedule a PDSCH communication, in accordance with various aspects of the present disclosure.

FIG. 8A is a diagram illustrating an example 800 of transmitting HARQ-ACK for a DCI message that includes a secondary cell dormancy indication and does not schedule a PDSCH communication, in accordance with various aspects of the present disclosure.

As shown in FIG. 8A, and by reference number 810, the UE may receive a DCI message including a secondary cell dormancy indication. The UE may receive the DCI message via a PDCCH during a slot and/or sub-slot n. The DCI message may indicate (e.g., via a PDSCH to HARQ feedback timing indicator) an amount of time that the UE is to wait before transmitting HARQ-ACK for the DCI message. In some aspects, the UE may be configured (e.g., via RRC signaling) to use a time (e.g., slot and/or sub-slot n) of reception of the DCI message as a reference time from which the UE determines the time to transmit the HARQ-ACK. For example, the UE may determine that the time to transmit the HARQ-ACK is m slots and/or sub-slots after receiving the DCI message.

As shown by reference number 820, the UE may wait m slots and/or sub-slots to transmit the HARQ-ACK. In some aspects, the UE may determine the number m of slots and/or sub-slots to wait based at least in part on a value of a PDSCH to HARQ feedback timing indicator field of the DCI message.

As shown by reference number 830, the UE may transmit the HARQ-ACK during a slot and/or sub-slot n+m. In some aspects, the UE may transmit the HARQ-ACK via a PUCCH.

As indicated above, FIG. 8A is provided as an example. Other examples may differ from what is described with respect to FIG. 8A.

Figure 8B:
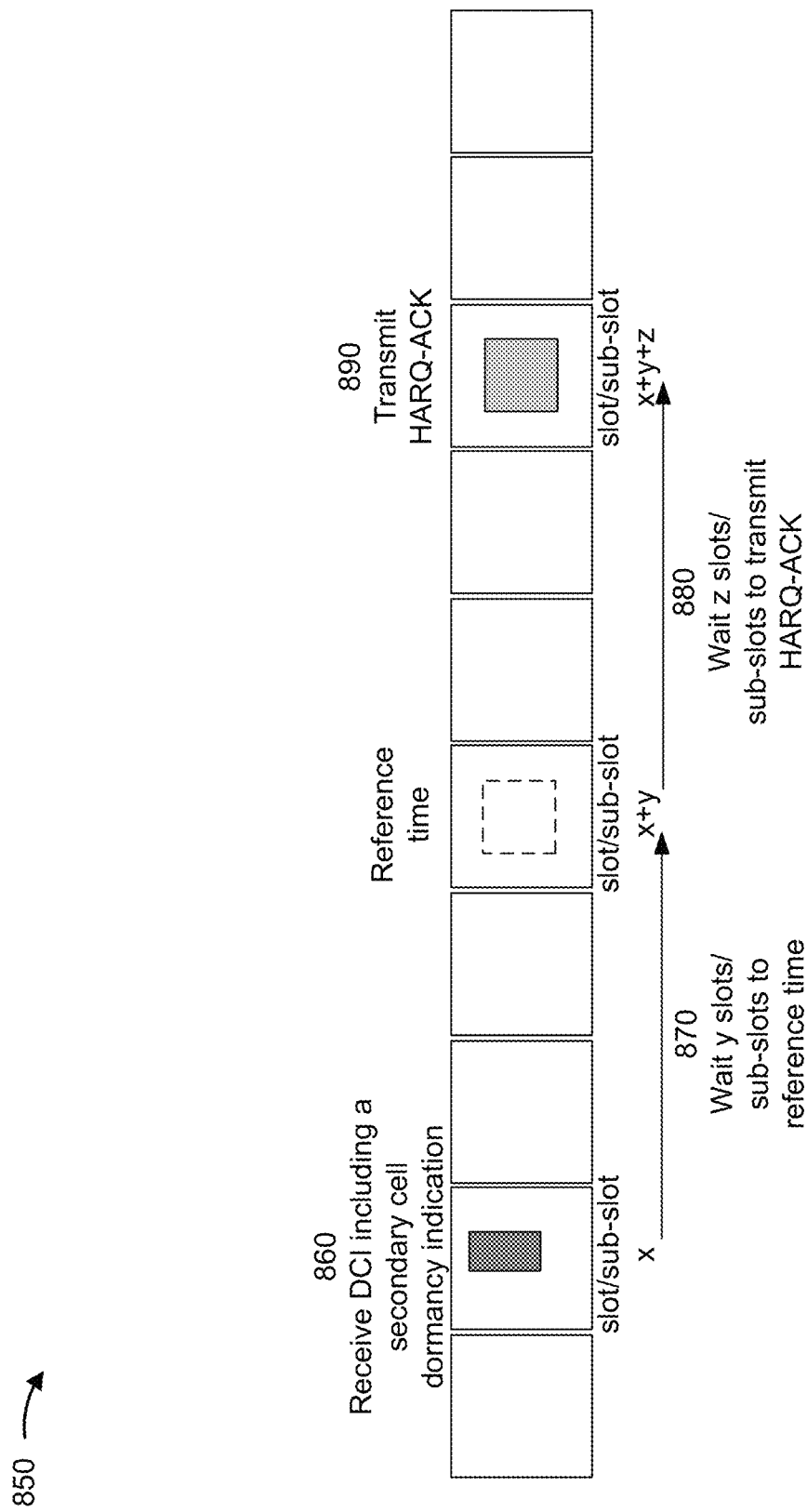
FIG. 8B is a diagram illustrating an example of transmitting HARQ-ACK for a DCI message that includes a secondary cell dormancy indication and does not schedule a PDSCH communication, in accordance with various aspects of the present disclosure.

FIG. 8B is a diagram illustrating an example 850 of transmitting HARQ-ACK for a DCI message that includes a secondary cell dormancy indication and does not schedule a PDSCH communication, in accordance with various aspects of the present disclosure.

As shown in FIG. 8B, and by reference number 460, the UE may receive a DCI message including a secondary cell dormancy indication. The UE may receive the DCI message via a PDCCH during a slot and/or sub-slot x. The DCI message may indicate (e.g., via a PDSCH to HARQ feedback timing indicator) an amount of time that the UE is to wait after a reference time before transmitting HARQ-ACK for the DCI message. The DCI message may indicate the reference time as a slot or sub-slot indicated by a value of a TDRA field of the DCI message.

As shown by reference number 870, the UE may determine to wait y slots and/or sub-slots to the reference time x+y. In some aspects, the UE may determine that the TDRA field (e.g., using a K0 value) identifies slot and/or sub-slot x+y as a reference time, where y is an amount of time from reception of the DCI message to a hypothetical PDSCH communication. In some aspects, the TDRA field may explicitly identify the reference time (e.g., using a slot and/or sub-slot index). In some aspects, the UE may determine that no PDSCH is scheduled based at least in part on a value of the FDRA field and may determine the reference time based at least in part on a value of the TDRA when the hypothetical PDSCH communication is not scheduled.

In some aspects, the UE may be configured (e.g., via RRC signaling) to use a time (e.g., slot and/or sub-slot x+y) indicated by a TDRA field of the DCI message as a reference time from which the UE determines the time to transmit the HARQ-ACK for the DCI message.

As shown by reference number 880, the UE may wait z slots and/or sub-slots from the reference slot and/or sub-slot x+z to transmit the HARQ-ACK for the DCI message. In some aspects, the UE may determine the value of z from a PDSCH to HARQ feedback timing indicator or other indication in the DCI message. Based at least in part on values of y and z, the UE may determine a time to transmit the HARQ-ACK. For example, the UE may determine that the time to transmit the HARQ-ACK is y+z slots and/or sub-slots after receiving the DCI message at time x.

As shown by reference number 890, the UE may transmit the HARQ-ACK during a slot and/or sub-slot x+y+z. In some aspects, the UE may transmit the HARQ-ACK via a PUCCH.

As indicated above, FIG. 8B is provided as an example. Other examples may differ from what is described with respect to FIG. 8B.

Figure 9:
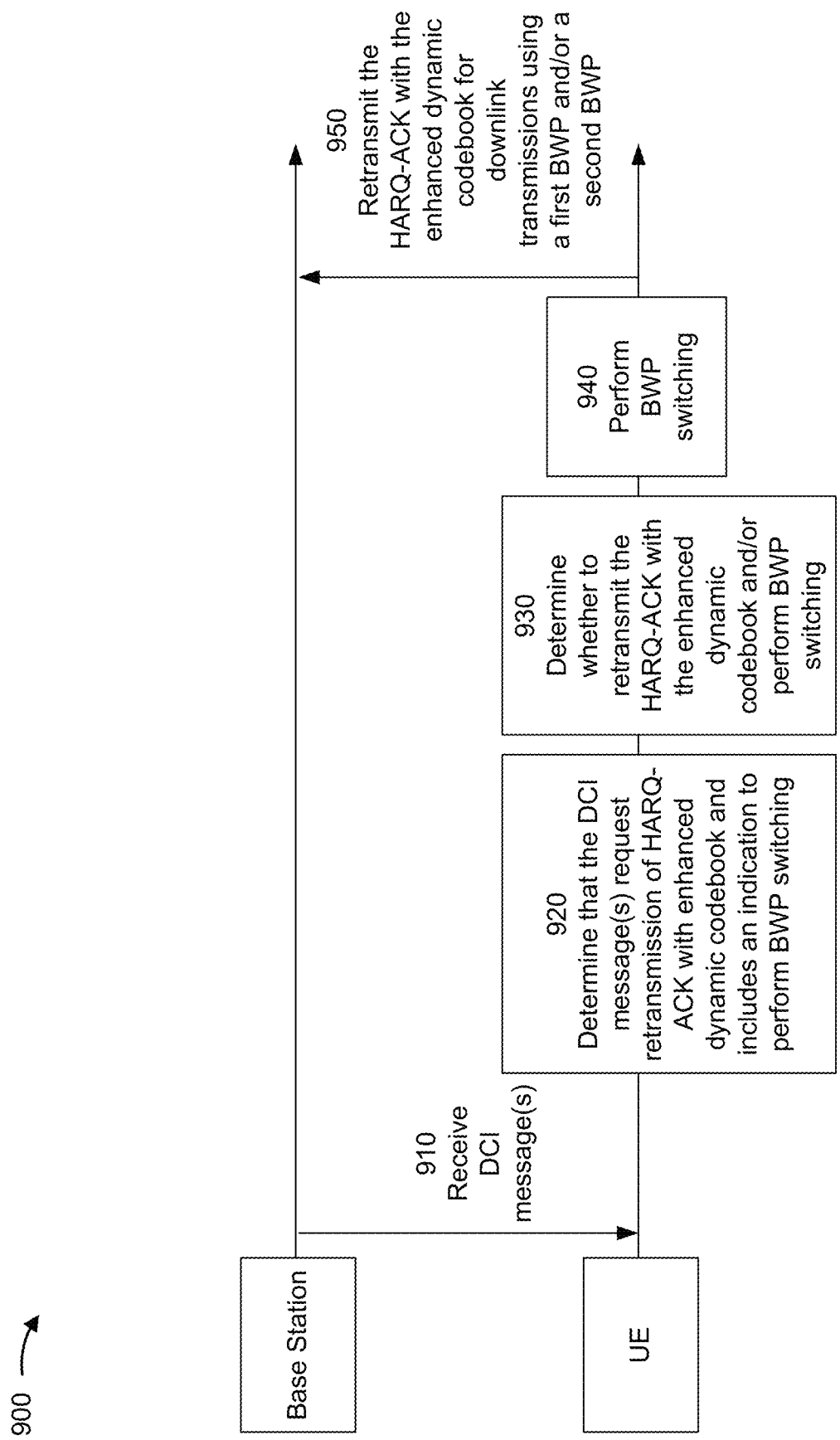
FIG. 9 is a diagram illustrating an example of retransmitting HARQ-ACK for a DCI message that requests retransmission of HARQ-ACK with an enhanced dynamic codebook and includes an indication to perform bandwidth part switching, in accordance with various aspects of the present disclosure.

FIG. 9 is a diagram illustrating an example 900 of retransmitting HARQ-ACK for a DCI message that requests retransmission of HARQ-ACK with an enhanced dynamic codebook and includes an indication to perform bandwidth part switching, in accordance with various aspects of the present disclosure.

As shown in FIG. 9, and by reference number 910, the UE may receive one or more DCI messages from the base station (e.g., via one or more PDCCHs). In some aspects, the DCI message may include a DCI format 1_1 message. The one or more DCI messages may be used to schedule one or more PDSCH communications, to request Type 3 HARQ-ACK, to indicate to perform bandwidth part switching, and/or the like. In some aspects, the one or more DCI messages may include a request for retransmission of HARQ-ACK that was previously transmitted or failed to transmit based at least in part on a listen-before-talk failure (e.g., using an unlicensed band). The one or more DCI messages may also include an indication to perform bandwidth part switching, a request for HARQ-ACK, an indication of a resource allocation (e.g., FDRA and/or TDRA) for a PDSCH, and/or the like.

As shown by reference number 920, the UE may determine that one or more DCI messages of the one or more DCI messages requests retransmission of HARQ-ACK with an enhanced dynamic codebook and includes an indication to perform bandwidth part switching. In some aspects, the request for the retransmission of HARQ-ACK with the enhanced dynamic codebook may trigger a first group of HARQ-ACKs associated with one or more PDSCH communications received before performing bandwidth part switching and a second group of HARQ-ACKs associated with one or more PDSCH communications received after performing bandwidth part switching.

As shown by reference number 930, the UE may determine whether to retransmit the HARQ-ACK with the enhanced dynamic codebook for the first group and/or the second group of HARQ-ACKs and/or perform BWP switching. In some aspects, the UE may be configured to ignore the request for retransmission of HARQ-ACK with enhanced dynamic codebook, the indication to perform BWP switching, and/or both (e.g., based at least in part on a determination that the DCI message is in error).

As shown by reference number 940, the UE may perform the bandwidth part switching. In some aspects, a component carrier using a first bandwidth part may begin to use a second bandwidth part for future communications. This may require the UE to modify one or more components of the UE to prepare to communicate via the second bandwidth part. In some aspects, the UE may toggle (e.g., reset to a default value) a new feedback indicator based at least in part on performing the bandwidth part switching.

As shown by reference number 950, the UE may retransmit the HARQ-ACK with the enhanced dynamic codebook for downlink transmissions using the first BWP and/or the second BWP. In some aspects, if both of the first group of HARQ-ACKs and the second group of HARQ-ACKs are triggered by the one or more DCI messages, the UE may only report ACK-NACK for PDSCH communications scheduled on the second bandwidth part and may ignore triggering for the first group of HARQ-ACKs. In some of these aspects, an ACK/NACK codebook size may be based at least in part on an assumption that the first group of HARQ-ACKs is not triggered and may not consider a downlink assignment index of the first group of HARQ-ACKs. In some aspects, the UE may report ACK/NACK for the first group of HARQ-ACKs and the second group of HARQ-ACKs with default values set for the first group of HARQ-ACKs.

As indicated above, FIG. 9 is provided as an example. Other examples may differ from what is described with respect to FIG. 9.

Figure 10:
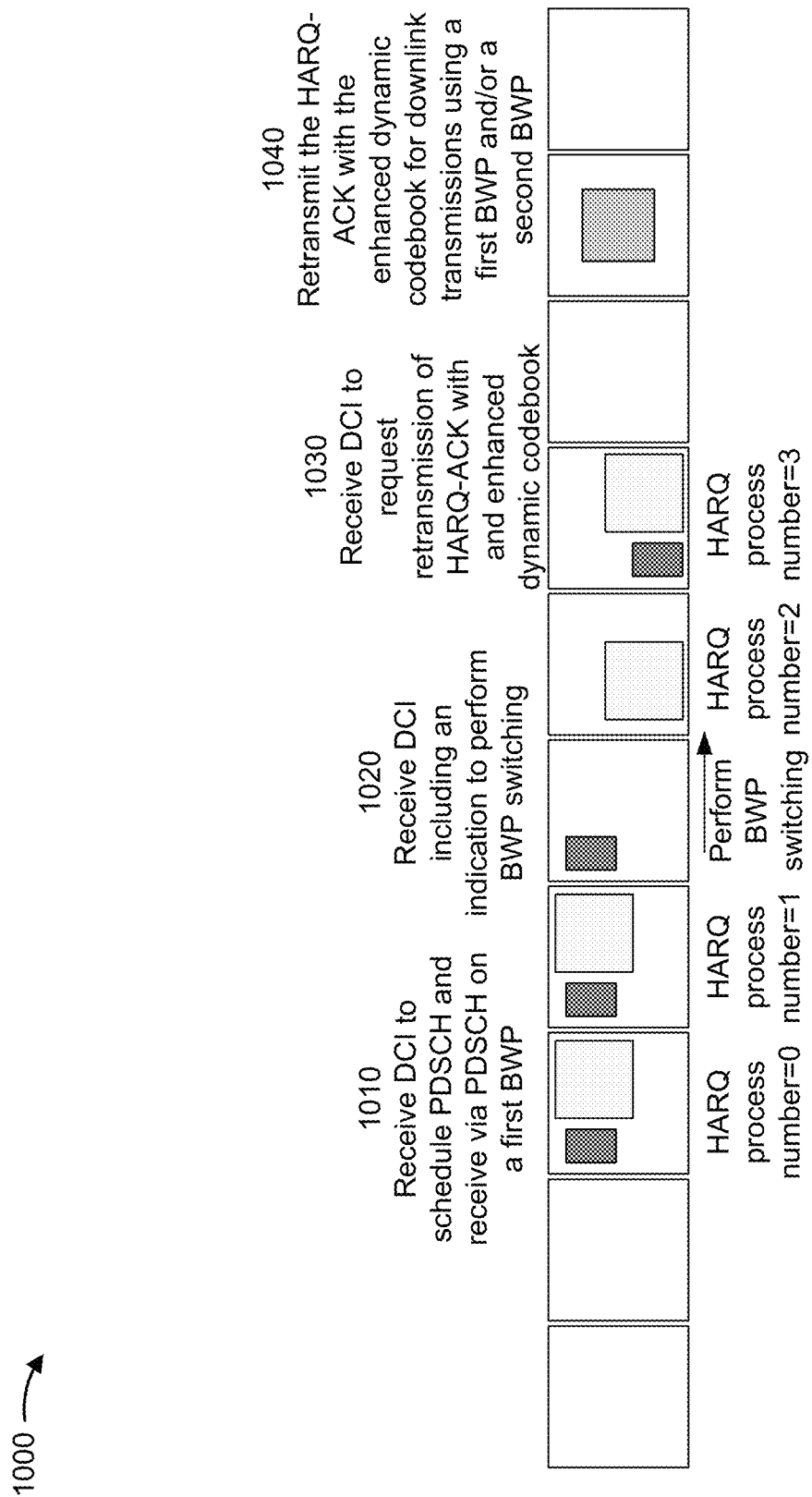
FIG. 10 is a diagram illustrating an example of retransmitting HARQ-ACK for a DCI message that requests retransmission of HARQ-ACK with an enhanced dynamic codebook and includes an indication to perform bandwidth part switching, in accordance with various aspects of the present disclosure.

FIG. 10 is a diagram illustrating an example 1000 of retransmitting HARQ-ACK for a DCI message that requests retransmission of HARQ-ACK with an enhanced dynamic codebook and includes an indication to perform bandwidth part switching, in accordance with various aspects of the present disclosure.

As shown in FIG. 10, and by reference number 1010, the UE may receive a DCI message to schedule one or more PDSCH communications using a first bandwidth part. The UE may also receive the one or more PDSCH communications using the first bandwidth part. In some aspects, the UE may store and/or buffer HARQ feedback associated with the one or more PDSCH communications (e.g., HARQ process number=0, HARQ process number=1, and/or the like).

As shown by reference number 1020, the UE may receive a DCI message that includes an indication to perform bandwidth part switching. In some aspects, the UE may determine to perform the bandwidth part switching, and prepare to begin communicating via the second bandwidth part.

As shown by reference number 1030, the UE may receive a DCI message to request transmission of HARQ-ACK with an enhanced dynamic codebook after performing the bandwidth part switching. In some aspects, the UE may have HARQ feedback stored and/or buffered that is associated with the one or more PDSCH communications received via the first bandwidth part (e.g., HARQ process number=0, HARQ process number=1, and/or the like). In some aspects, the UE may have HARQ feedback stored and/or buffered that is associated with one or more PDSCH communications received via the second bandwidth part (e.g., HARQ process number=2, HARQ process number=3, and/or the like).

As shown by reference number 1040, the UE may retransmit the HARQ-ACK with the enhanced dynamic codebook for downlink transmissions using a first BWP and/or a second BWP. In some aspects, if both of the first group of HARQ-ACKs and the second group of HARQ-ACKs are triggered by the one or more DCI messages, the UE may only report ACK/NACK for PDSCH communications scheduled on the second bandwidth part and may ignore triggering for the first group of HARQ-ACKs. In some of these aspects, an ACK/NACK codebook size may be based at least in part on an assumption that the first group of HARQ-ACKs is not triggered and may not consider a downlink assignment index of the first group of HARQ-ACKs. In some aspects, the UE may report ACK/NACK for the first group of HARQ-ACKs and the second group of HARQ-ACKs with default values set for the first group of HARQ-ACKs.

As indicated above, FIG. 10 is provided as an example. Other examples may differ from what is described with respect to FIG. 10.

Figure 11:
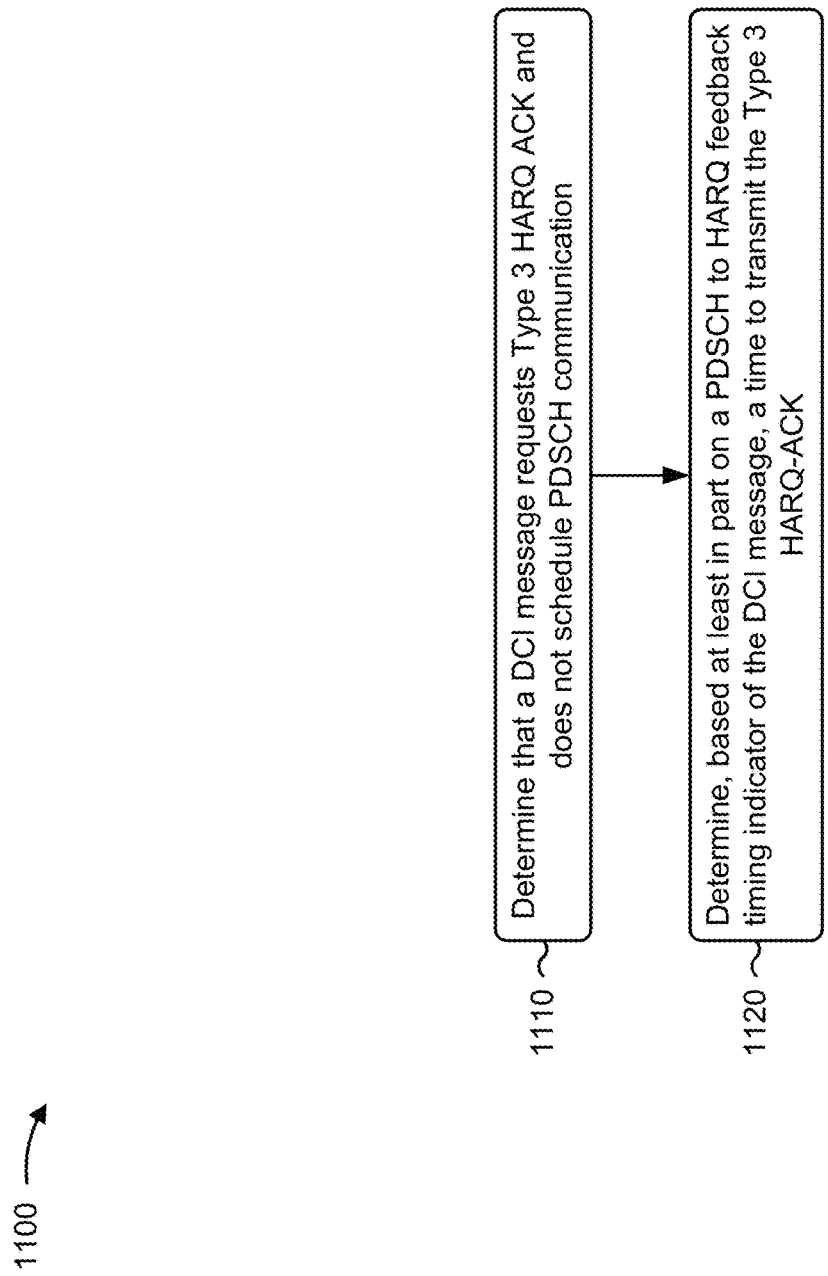
FIG. 11 is a diagram illustrating an example process performed, for example, by a user equipment, in accordance with various aspects of the present disclosure.

FIG. 11 is a diagram illustrating an example process 1100 performed, for example, by a UE, in accordance with various aspects of the present disclosure. Example process 1100 is an example where the UE (e.g., UE 120 and/or the like) performs operations associated with determining timing for Type-3 HARQ-ACK for DCI without PDSCH scheduling.

As shown in FIG. 11, in some aspects, process 1100 may include determining that a DCI message requests Type 3 HARQ-ACK and does not schedule a PDSCH communication (block 1110). For example, the UE (e.g., using receive processor 258, transmit processor 264, controller/processor 280, memory 282, and/or the like) may determine that a DCI message requests Type 3 HARQ-ACK and does not schedule a PDSCH communication, as described above. In some aspects, the UE may determine that the DCI message requests Type 3 HARQ-ACK and does not schedule a PDSCH communication based at least in part on an indication in a one-shot HARQ-ACK request field and a value of an FDRA field.

As further shown in FIG. 11, in some aspects, process 1100 may include determining, based at least in part on a PDSCH to HARQ feedback timing indicator of the DCI message, a time to transmit the Type 3 HARQ-ACK (block 1120). For example, the UE (e.g., using receive processor 258, transmit processor 264, controller/processor 280, memory 282, and/or the like) may determine, based at least in part on a PDSCH to HARQ feedback timing indicator of the DCI message, a time to transmit the Type 3 HARQ-ACK, as described above. In some aspects, the UE may determine the time to transmit the Type 3 HARQ-ACK based at least in part on a reference time and a PDSCH to HARQ feedback timing indicator.

Process 1100 may include additional aspects, such as any single aspect or any combination of aspects described below and/or in connection with one or more other processes described elsewhere herein.

In a first aspect, the time to transmit the Type 3 HARQ-ACK is based at least in part on a reference time and the PDSCH to HARQ feedback timing indicator of the DCI message.

In a second aspect, alone or in combination with the first aspect, the PDSCH to HARQ feedback timing indicator of the DCI message indicates an amount of time.

In a third aspect, alone or in combination with one or more of the first and second aspects, the PDSCH to HARQ feedback timing indicator of the DCI message indicates the amount of time based at least in part on a number of slots or sub-slots.

In a fourth aspect, alone or in combination with one or more of the first through third aspects, the reference time is a slot or sub-slot during which the UE receives the DCI message.

In a fifth aspect, alone or in combination with one or more of the first through fourth aspects, the reference time is a slot or sub-slot indicated by a value of a TDRA field of the DCI message.

In a sixth aspect, alone or in combination with one or more of the first through fifth aspects, the PDSCH to HARQ feedback indicator of the DCI message is a value of a K1 field of the DCI message.

In a seventh aspect, alone or in combination with one or more of the first through sixth aspects, process 1100 includes transmitting the Type 3 HARQ-ACK at the determined time.

In an eighth aspect, alone or in combination with one or more of the first through seventh aspects, determining that the DCI message requests Type 3 HARQ-ACK and does not schedule a PDSCH communication includes determining that the DCI does not schedule a PDSCH communication based at least in part on a value of an FDRA field of the DCI.

In a ninth aspect, alone or in combination with one or more of the first through eighth aspects, the value of the FDRA field of the DCI is all zeros if resource allocation Type 0 is configured, all ones if resource allocation Type 1 is configured, and all ones or all zeros if both resource allocation Type 0 and resource allocation Type 1 are configured.

In a tenth aspect, alone or in combination with one or more of the first through ninth aspects, the time to transmit the Type 3 HARQ-ACK is based at least in part on a slot or sub-slot during which the UE receives the DCI message and the PDSCH to HARQ feedback timing indicator of the DCI message. For example, the time to transmit the Type 3 HARQ-ACK may use the slot or sub-slot during which the UE receives the DCI message as a reference time and may transmit the Type 3 HARQ-ACK after an amount of time (e.g., a number of slots and/or sub-slots) as indicated by the PDSCH to HARQ feedback timing indicator of the DCI message.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
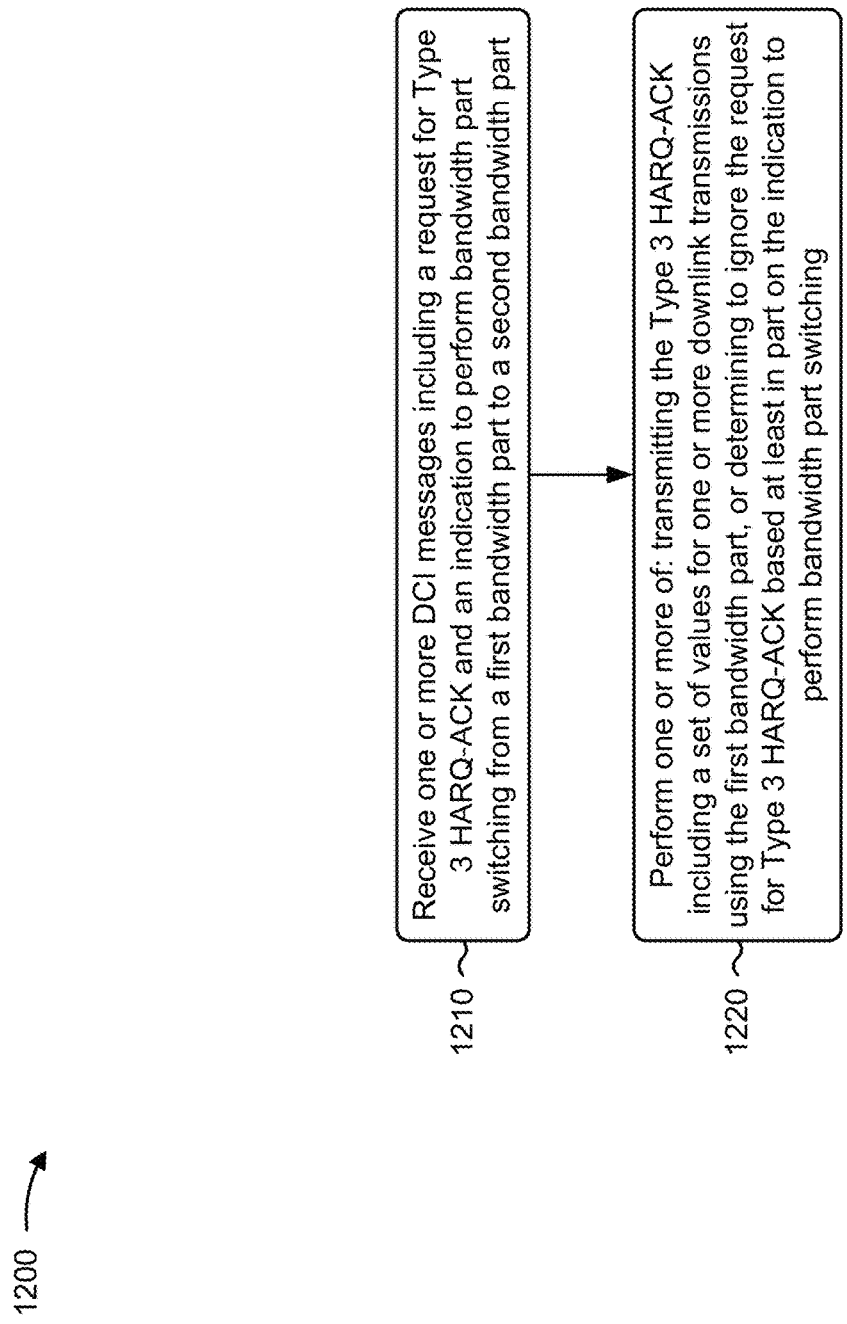
FIG. 12 is a diagram illustrating an example process performed, for example, by a user equipment, in accordance with various aspects of the present disclosure.

FIG. 12 is a diagram illustrating an example process 1200 performed, for example, by a UE, in accordance with various aspects of the present disclosure. Example process 1200 is an example where the UE (e.g., UE 120 and/or the like) performs operations associated with Type 3 HARQ-ACK after bandwidth part switching.

As shown in FIG. 12, in some aspects, process 1200 may include receiving one or more DCI messages including a request for Type 3 HARQ-ACK and an indication to perform bandwidth part switching from a first bandwidth part to a second bandwidth part (block 1210). For example, the UE (e.g., using receive processor 258, transmit processor 264, controller/processor 280, memory 282, and/or the like) may receive one or more DCI messages including a request for Type 3 HARQ-ACK and an indication to perform bandwidth part switching from a first bandwidth part to a second bandwidth part, as described above.

As further shown in FIG. 12, in some aspects, process 1200 may include performing one or more of transmitting the Type 3 HARQ-ACK including a set of values for one or more downlink transmissions using the first bandwidth part, or determining to ignore the request for Type 3 HARQ-ACK based at least in part on the indication to perform bandwidth part switching (block 1220). For example, the UE (e.g., using receive processor 258, transmit processor 264, controller/processor 280, memory 282, and/or the like) may perform one or more of transmitting the Type 3 HARQ-ACK including a set of values for one or more downlink transmissions using the first bandwidth part, or determining to ignore the request for Type 3 HARQ-ACK based at least in part on the indication to perform bandwidth part switching, as described above. In some aspects, the UE may determine whether to transmit the Type 3 HARQ-ACK including a set of values for one or more downlink transmissions using the first bandwidth part or to ignore the request for Type 3 HARQ-ACK based at least in part on a configuration of the UE, the indication to perform bandwidth part switching, and/or the like.

Process 1200 may include additional aspects, such as any single aspect or any combination of aspects described below and/or in connection with one or more other processes described elsewhere herein.

In a first aspect, process 1200 includes transmitting the Type 3 HARQ-ACK including the set of values for the one or more downlink transmissions using the first bandwidth part, and performing the bandwidth part switching from the first bandwidth part to the second bandwidth part, wherein the Type 3 HARQ-ACK is including the set of values for the one or more downlink transmissions using the first bandwidth part and an additional set of values for one or more downlink transmissions using the second bandwidth part.

In a second aspect, alone or in combination with the first aspect, the set of values is based at least in part on decoding results of the one or more downlink transmissions using the first bandwidth part.

In a third aspect, alone or in combination with one or more of the first and second aspects, the set of values is independent from decoding results of the one or more downlink transmissions using the first bandwidth part.

In a fourth aspect, alone or in combination with one or more of the first through third aspects, the set of values indicate negative acknowledgment for the one or more downlink transmissions using the first bandwidth part.

In a fifth aspect, alone or in combination with one or more of the first through fourth aspects, the Type 3 HARQ-ACK for the one or more downlink transmissions using the first bandwidth part comprises NDI values corresponding to the one or more downlink transmissions using the first bandwidth part, and the NDI values are based at least in part on actual NDI values associated with one or more downlink transmissions using the first bandwidth part, or the NDI values are set to a default NDI value.

In a sixth aspect, alone or in combination with one or more of the first through fifth aspects, the default NDI value is 0 (zero).

In a seventh aspect, alone or in combination with one or more of the first through sixth aspects, the UE is configured to transmit CBG based acknowledgements or negative acknowledgements for CBGs of the first bandwidth part, and the Type 3 HARQ-ACK includes a negative acknowledgement for each of the CBGs of the one or more downlink transmissions using the first bandwidth part.

In an eighth aspect, alone or in combination with one or more of the first through seventh aspects, process 1200 includes receiving the indication to perform bandwidth part switching via a first DCI message of the one or more DCI messages, and receiving, after receiving the first DCI message, the request for Type 3 HARQ-ACK via a second DCI message of the one or more DCI messages.

In a ninth aspect, alone or in combination with one or more of the first through eighth aspects, process 1200 includes receiving, within a single DCI message of the one or more DCI messages, the request for Type 3 HARQ-ACK and the indication to perform bandwidth part switching.

In a tenth aspect, alone or in combination with one or more of the first through ninth aspects, process 1200 includes determining to ignore the indication to perform bandwidth part switching based at least in part on the single DCI message including the request for Type 3 HARQ-ACK, determining to ignore the request for Type 3 HARQ-ACK based at least in part on the single DCI message including the indication to perform bandwidth part switching, or determining that the DCI is in error based at least in part on the single DCI message including both of the indication to perform bandwidth part switching and the request for Type 3 HARQ-ACK.

In an eleventh aspect, alone or in combination with one or more of the first through tenth aspects, process 1200 includes determining to ignore the indication to perform bandwidth part switching based at least in part on the single DCI message including the request for Type 3 HARQ-ACK and the single DCI message not scheduling a PDSCH communication, determining to ignore the request for Type 3 HARQ-ACK based at least in part on the single DCI message including the indication to perform bandwidth part switching and the single DCI message not scheduling a PDSCH communication, or determining that the DCI is in error based at least in part on the single DCI message including both of the indication to perform bandwidth part switching and the request for Type 3 HARQ-ACK and the single DCI message not scheduling a PDSCH communication.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
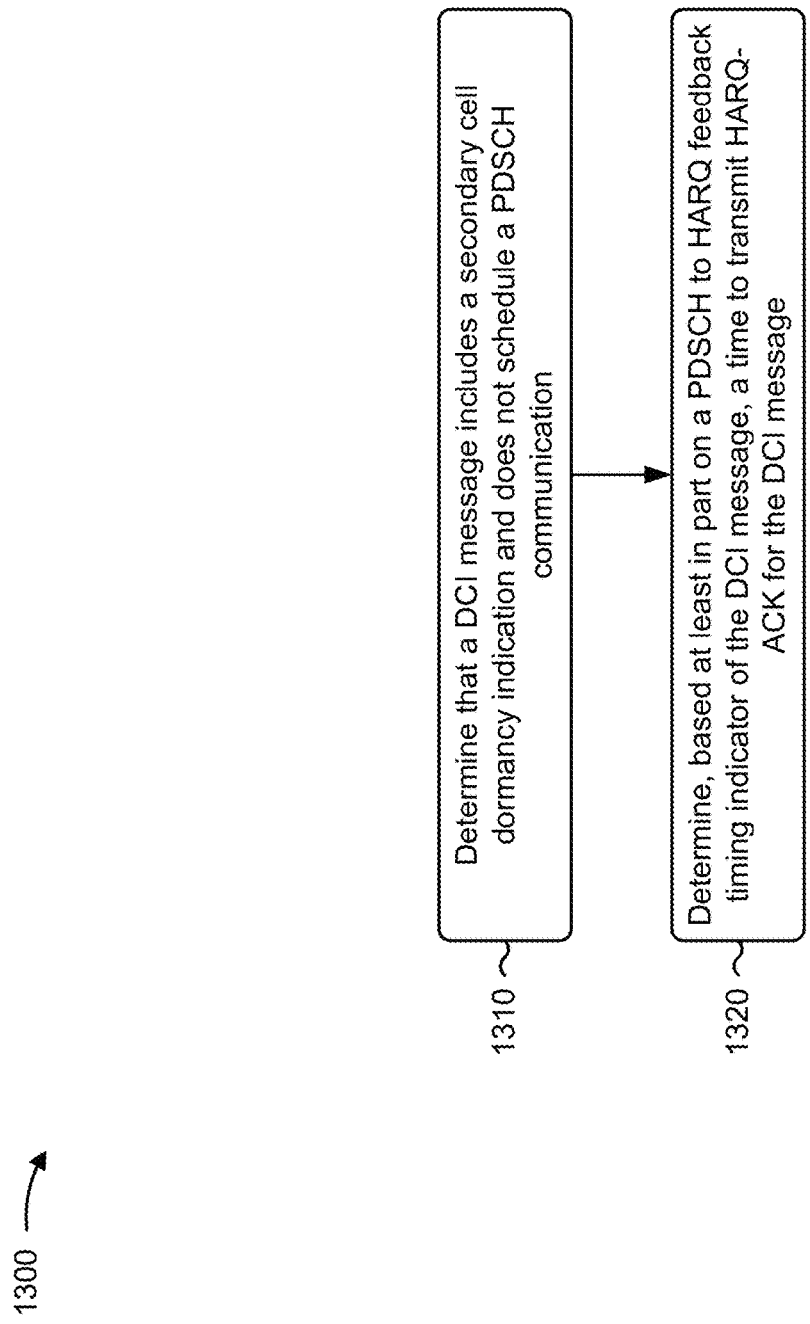
FIG. 13 is a diagram illustrating an example process performed, for example, by a user equipment, in accordance with various aspects of the present disclosure.

FIG. 13 is a diagram illustrating an example process 1300 performed, for example, by a UE, in accordance with various aspects of the present disclosure. Example process 1300 is an example where the UE (e.g., UE 120 and/or the like) performs operations associated with determining timing for HARQ-ACK for DCI including a secondary cell dormancy indication without PDSCH scheduling.

As shown in FIG. 13, in some aspects, process 1300 may include determining that a DCI message includes a secondary cell dormancy indication and does not schedule a PDSCH communication (block 1310). For example, the UE (e.g., using receive processor 258, transmit processor 264, controller/processor 280, memory 282, and/or the like) may determine that a DCI message includes a secondary cell dormancy indication and does not schedule a PDSCH communication, as described above. In some aspects, the UE may determine that the DCI message request includes a secondary cell dormancy indication and does not schedule a PDSCH communication based at least in part on a value of an FDRA field.

As further shown in FIG. 13, in some aspects, process 1300 may include determining, based at least in part on a PDSCH to HARQ feedback timing indicator of the DCI message, a time to transmit HARQ acknowledgement (HARQ-ACK) for the DCI message (block 1320). For example, the UE (e.g., using receive processor 258, transmit processor 264, controller/processor 280, memory 282, and/ or the like) may determine, based at least in part on a PDSCH to HARQ feedback timing indicator of the DCI message, a time to transmit HARQ acknowledgement (HARQ-ACK) for the DCI message, as described above. In some aspects, the UE may determine the time to transmit the HARQ-ACK for the DCI message based at least in part on a reference time and a PDSCH to HARQ feedback timing indicator.

Process 1300 may include additional aspects, such as any single aspect or any combination of aspects described below and/or in connection with one or more other processes described elsewhere herein.

In a first aspect, the time to transmit the HARQ-ACK is based at least in part on a reference time and the PDSCH to HARQ feedback timing indicator of the DCI message.

In a second aspect, alone or in combination with the first aspect, the PDSCH to HARQ feedback timing indicator of the DCI message indicates an amount of time.

In a third aspect, alone or in combination with one or more of the first and second aspects, the PDSCH to HARQ feedback timing indicator of the DCI message indicates the amount of time based at least in part on a number of slots or sub-slots.

In a fourth aspect, alone or in combination with one or more of the first through third aspects, the reference time is a slot or sub-slot during which the UE receives the DCI message.

In a fifth aspect, alone or in combination with one or more of the first through fourth aspects, the reference time is a slot or sub-slot indicated by a value of a TDRA field of the DCI message.

In a sixth aspect, alone or in combination with one or more of the first through fifth aspects, the PDSCH to HARQ feedback indicator of the DCI message is a value of a K1 field of the DCI message.

In a seventh aspect, alone or in combination with one or more of the first through sixth aspects, determining that the DCI message includes a secondary cell dormancy indication and does not schedule a PDSCH communication includes determining that the DCI does not schedule a PDSCH communication based at least in part on a value of an FDRA field of the DCI.

In an eighth aspect, alone or in combination with one or more of the first through seventh aspects, the value of the FDRA field of the DCI is all zeros if resource allocation Type 0 is configured, all ones if resource allocation Type 1 is configured, and all ones or all zeros if both resource allocation Type 0 and resource allocation Type 1 are configured.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of aspects of the present disclosure:

Aspect 1: A method of wireless communication performed by a user equipment (UE), comprising: determining that a downlink control information (DCI) message requests Type 3 hybrid automatic repeat request (HARQ) acknowledgment (HARQ-ACK) and does not schedule a physical downlink shared channel (PDSCH) communication; and determining, based at least in part on a PDSCH to HARQ feedback timing indicator of the DCI message, a time to transmit the Type 3 HARQ-ACK.

Aspect 2: The method of aspect 1, wherein the time to transmit the Type 3 HARQ-ACK is based at least in part on a reference time and the PDSCH to HARQ feedback timing indicator of the DCI message.

Aspect 3: The method of aspect 2, wherein the PDSCH to HARQ feedback timing indicator of the DCI message indicates an amount of time.

Aspect 4: The method of aspect 3, wherein the PDSCH to HARQ feedback timing indicator of the DCI message indicates the amount of time based at least in part on a number of slots or sub-slots.

Aspect 5: The method of any of aspects 1 to 4, wherein the reference time is a slot or sub-slot during which the UE receives the DCI message.

Aspect 6: The method of any of aspects 1 to 5, wherein the reference time is a slot or sub-slot indicated by a value of a time domain resource allocation field of the DCI message.

Aspect 7: The method of any of aspects 1 to 6, wherein the PDSCH to HARQ feedback indicator of the DCI message is a value of a K1 field of the DCI message.

Aspect 8: The method of any of aspects 1 to 7, further comprising: transmitting the Type 3 HARQ-ACK at the determined time.

Aspect 9: The method of any of aspects 1 to 8, wherein determining that the DCI message requests Type 3 HARQ-ACK and does not schedule a PDSCH communication comprises: determining that the DCI does not schedule a PDSCH communication based at least in part on a value of a frequency domain resource allocation field of the DCI.

Aspect 10: The method of aspect 9, wherein the value of the frequency domain resource allocation field of the DCI is: all zeros if resource allocation Type 0 is configured, all ones if resource allocation Type 1 is configured, and all ones or all zeros if both resource allocation Type 0 and resource allocation Type 1 are configured.

Aspect 11: The method of any of aspects 1 to 10, wherein the Type 3 HARQ-ACK comprises HARQ-ACK feedback for one or more configured HARQ processes for one or more component carriers over which the UE communicates with a network.

Aspect 12: The method of any of aspects 1 to 11, wherein the time to transmit the Type 3 HARQ-ACK is based at least in part on a slot or sub-slot during which the UE receives the DCI message and the PDSCH to HARQ feedback timing indicator of the DCI message.

Aspect 13: A method of wireless communication performed by a user equipment (UE), comprising: receiving one or more downlink control information (DCI) messages including a request for Type 3 hybrid automatic repeat request (HARQ) acknowledgment (HARQ-ACK) and an indication to perform bandwidth part switching from a first bandwidth part to a second bandwidth part; and performing one or more of: transmitting the Type 3 HARQ-ACK including a set of values for one or more downlink transmissions using the first bandwidth part, or determining to ignore the request for Type 3 HARQ-ACK based at least in part on the indication to perform bandwidth part switching.

Aspect 14: The method of aspect 13, further comprising: transmitting the Type 3 HARQ-ACK including the set of values for the one or more downlink transmissions using the first bandwidth part; and performing the bandwidth part switching from the first bandwidth part to the second bandwidth part, wherein the Type 3 HARQ-ACK includes the set of values for the one or more downlink transmissions using the first bandwidth part and an additional set of values for one or more downlink transmissions using the second bandwidth part.

Aspect 15: The method of aspect 14, wherein the set of values is based at least in part on decoding results of the one or more downlink transmissions using the first bandwidth part.

Aspect 16: The method of aspect 14, wherein the set of values is independent from decoding results of the one or more downlink transmissions using the first bandwidth part.

Aspect 17: The method of aspect 16, wherein the set of values indicate negative acknowledgment for the one or more downlink transmissions using the first bandwidth part.

Aspect 18: The method of any of aspects 13 to 17, wherein the Type 3 HARQ-ACK for the one or more downlink transmissions using the first bandwidth part comprises new data indicator (NDI) values corresponding to the one or more downlink transmissions using the first bandwidth part, wherein the NDI values are based at least in part on actual NDI values associated with one or more downlink transmissions using the first bandwidth part, or wherein the NDI values are set to a default NDI value.

Aspect 19: The method of aspect 18, wherein the default NDI value is 0 (zero).

Aspect 20: The method of any of aspects 13 to 19, wherein the UE is configured to transmit code-block group (CBG) based acknowledgements or negative acknowledgements for CBGs of the first bandwidth part, and wherein the Type 3 HARQ-ACK comprises a negative acknowledgement for each of the CBGs of the one or more downlink transmissions using the first bandwidth part.

Aspect 21: The method of any of aspects 13 to 20, further comprising: receiving the indication to perform bandwidth part switching via a first DCI message of the one or more DCI messages; and receiving, after receiving the first DCI message, the request for Type 3 HARQ-ACK via a second DCI message of the one or more DCI messages.

Aspect 22: The method of any of aspects 13 to 21, further comprising: receiving, within a single DCI message of the one or more DCI messages, the request for Type 3 HARQ-ACK and the indication to perform bandwidth part switching.

Aspect 23: The method of aspect 22, further comprising: determining to ignore the indication to perform bandwidth part switching based at least in part on the single DCI message including the request for Type 3 HARQ-ACK; determining to ignore the request for Type 3 HARQ-ACK based at least in part on the single DCI message including the indication to perform bandwidth part switching; or determining that the DCI is in error based at least in part on the single DCI message including both of the indication to perform bandwidth part switching and the request for Type 3 HARQ-ACK.

Aspect 24: The method of aspect 22, further comprising: determining to ignore the indication to perform bandwidth part switching based at least in part on the single DCI message including the request for Type 3 HARQ-ACK and the single DCI message not scheduling a physical downlink shared channel (PDSCH) communication; determining to ignore the request for Type 3 HARQ-ACK based at least in part on the single DCI message including the indication to perform bandwidth part switching and the single DCI message not scheduling a PDSCH communication; or determining that the DCI is in error based at least in part on the single DCI message including both of the indication to perform bandwidth part switching and the request for Type 3 HARQ-ACK and the single DCI message not scheduling a PDSCH communication.

Aspect 25: A method of wireless communication performed by a user equipment (UE), comprising: determining that a downlink control information (DCI) message includes a secondary cell dormancy indication and does not schedule a physical downlink shared channel (PDSCH) communication; and determining, based at least in part on a PDSCH to hybrid automatic repeat request (HARQ) feedback timing indicator of the DCI message, a time to transmit HARQ acknowledgement (HARQ-ACK) for the DCI message.

Aspect 26: The method of aspect 25, wherein the time to transmit the HARQ-ACK is based at least in part on a reference time and the PDSCH to HARQ feedback timing indicator of the DCI message.

Aspect 27: The method of aspect 26, wherein the PDSCH to HARQ feedback timing indicator of the DCI message indicates an amount of time.

Aspect 28: The method of aspect 27, wherein the PDSCH to HARQ feedback timing indicator of the DCI message indicates the amount of time based at least in part on a number of slots or sub-slots.

Aspect 29: The method of any of aspects 25-28, wherein the reference time is a slot or sub-slot during which the UE receives the DCI message.

Aspect 30: The method of any of aspects 25-29, wherein the reference time is a slot or sub-slot indicated by a value of a time domain resource allocation field of the DCI message.

Aspect 31: The method of any of aspects 25-30, wherein the PDSCH to HARQ feedback indicator of the DCI message is a value of a K1 field of the DCI message.

Aspect 32: The method of any of aspects 25-31, wherein determining that the DCI message includes a secondary cell dormancy indication and does not schedule a PDSCH communication comprises: determining that the DCI does not schedule a PDSCH communication based at least in part on a value of a frequency domain resource allocation field of the DCI.

Aspect 33: The method of aspect 32, wherein the value of the frequency domain resource allocation field of the DCI is: all zeros if resource allocation Type 0 is configured, all ones if resource allocation Type 1 is configured, and all ones or all zeros if both resource allocation Type 0 and resource allocation Type 1 are configured.

Aspect 34: An apparatus for wireless communication at a device, comprising a processor; memory coupled with the processor; and instructions stored in the memory and executable by the processor to cause the apparatus to perform the method of one or more aspects of aspects 1-33.

Aspect 35: A device for wireless communication, comprising a memory and one or more processors coupled to the memory, the memory and the one or more processors configured to perform the method of one or more aspects of aspects 1-33.

Aspect 36: An apparatus for wireless communication, comprising at least one means for performing the method of one or more aspects of aspects 1-33.

Aspect 37: A non-transitory computer-readable medium storing code for wireless communication, the code comprising instructions executable by a processor to perform the method of one or more aspects of aspects 1-33.

Aspect 38: A non-transitory computer-readable medium storing a set of instructions for wireless communication, the set of instructions comprising one or more instructions that, when executed by one or more processors of a device, cause the device to perform the method of one or more aspects of aspects 1-33.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining that a downlink control information (DCI) message requests bandwidth part switching and one-shot hybrid automatic repeat request (HARQ) feedback and does not schedule a physical downlink shared channel (PDSCH) communication; and
    transmitting, based at least in part on the DCI message requesting the bandwidth part switching and a PDSCH to HARQ feedback timing indicator of the DCI message, the one-shot HARQ feedback.

2. The method of claim 1, wherein a time to transmit the one-shot HARQ feedback is based at least in part on a slot or sub-slot during which the UE receives the DCI message and the PDSCH to HARQ feedback timing indicator of the DCI message.

3. The method of claim 1, wherein a time to transmit the one-shot HARQ feedback is based at least in part on a reference time and the PDSCH to HARQ feedback timing indicator of the DCI message.

4. The method of claim 3, wherein the PDSCH to HARQ feedback timing indicator of the DCI message indicates an amount of time.

5. The method of claim 4, wherein the PDSCH to HARQ feedback timing indicator of the DCI message indicates the amount of time based at least in part on a number of slots or sub-slots.

6. The method of claim 3, wherein the reference time is a slot or sub-slot indicated by a value of a time domain resource allocation field of the DCI message.

7. The method of claim 1, further comprising:
determining, based at least in part on the PDSCH to HARQ feedback timing indicator of the DCI message, a time to transmit the one-shot HARQ feedback.

8. The method of claim 1, wherein the one-shot HARQ feedback comprises HARQ acknowledgment (HARQ-ACK) feedback for one or more configured HARQ processes for one or more component carriers over which the UE communicates with a network.

9. The method of claim 1, wherein determining that the DCI message requests one-shot HARQ feedback and does not schedule a PDSCH communication comprises:
determining that the DCI does not schedule a PDSCH communication based at least in part on a value of a frequency domain resource allocation field of the DCI.

10. The method of claim 9, wherein the value of the frequency domain resource allocation field of the DCI is:
all zeros if resource allocation Type 0 is configured,
all ones if resource allocation Type 1 is configured, and
all ones or all zeros if both resource allocation Type 0 and resource allocation Type 1 are configured.

11. A user equipment (UE) for wireless communication, comprising:
a memory; and
one or more processors coupled to the memory, the one or more processors configured to:
determine that a downlink control information (DCI) message requests bandwidth part switching and one-shot hybrid automatic repeat request (HARQ) feedback and does not schedule a physical downlink shared channel (PDSCH) communication; and
transmit, based at least in part on the DCI message requesting the bandwidth part switching and a PDSCH to HARQ feedback timing indicator of the DCI message, the one-shot HARQ feedback.

12. The UE of claim 11, wherein a time to transmit the one-shot HARQ feedback is based at least in part on a slot or sub-slot during which the UE receives the DCI message and the PDSCH to HARQ feedback timing indicator of the DCI message.

13. The UE of claim 11, wherein a time to transmit the one-shot HARQ feedback is based at least in part on a reference time and the PDSCH to HARQ feedback timing indicator of the DCI message.

14. The UE of claim 13, wherein the PDSCH to HARQ feedback timing indicator of the DCI message indicates an amount of time.

15. The UE of claim 14, wherein the PDSCH to HARQ feedback timing indicator of the DCI message indicates the amount of time based at least in part on a number of slots or sub-slots.

16. The UE of claim 13, wherein the reference time is a slot or sub-slot indicated by a value of a time domain resource allocation field of the DCI message.

17. The UE of claim 11, wherein the one or more processors are further configured to:
determine, based at least in part on the PDSCH to HARQ feedback timing indicator of the DCI message, a time to transmit the one-shot HARQ feedback.

18. The UE of claim 11, wherein the one-shot HARQ feedback comprises HARQ acknowledgment (HARQ-ACK) feedback for one or more configured HARQ processes for one or more component carriers over which the UE communicates with a network.

19. The UE of claim 11, wherein a determination that the DCI message requests one-shot HARQ feedback and does not schedule a PDSCH communication comprises:
a determination that the DCI does not schedule a PDSCH communication based at least in part on a value of a frequency domain resource allocation field of the DCI.

20. The UE of claim 19, wherein the value of the frequency domain resource allocation field of the DCI is:
all zeros if resource allocation Type 0 is configured,
all ones if resource allocation Type 1 is configured, and
all ones or all zeros if both resource allocation Type 0 and resource allocation Type 1 are configured.

21. A non-transitory computer-readable medium storing a set of instructions for wireless communication, the set of instructions comprising:
one or more instructions that, when executed by one or more processors of a user equipment (UE), cause the UE to:
determine that a downlink control information (DCI) message requests bandwidth part switching and one-shot hybrid automatic repeat request (HARQ) feedback and does not schedule a physical downlink shared channel (PDSCH) communication; and
transmit, based at least in part on the DCI message requesting the bandwidth part switching and a PDSCH to HARQ feedback timing indicator of the DCI message, the one-shot HARQ feedback.

22. The non-transitory computer-readable medium of claim 21, wherein a time to transmit the one-shot HARQ feedback is based at least in part on a slot or sub-slot during which the UE receives the DCI message and the PDSCH to HARQ feedback timing indicator of the DCI message.

23. The non-transitory computer-readable medium of claim 21, wherein a time to transmit the one-shot HARQ feedback is based at least in part on a reference time and the PDSCH to HARQ feedback timing indicator of the DCI message.

24. The non-transitory computer-readable medium of claim 21, wherein the one or more instructions further cause the UE to:
determine, based at least in part on the PDSCH to HARQ feedback timing indicator of the DCI message, a time to transmit the one-shot HARQ feedback.

25. The non-transitory computer-readable medium of claim 21, wherein the one-shot HARQ feedback comprises HARQ acknowledgment (HARQ-ACK) feedback for one or more configured HARQ processes for one or more component carriers over which the UE communicates with a network.

26. An apparatus for wireless communication, comprising:
means for determining that a downlink control information (DCI) message requests bandwidth part switching and one-shot hybrid automatic repeat request (HARQ) feedback and does not schedule a physical downlink shared channel (PDSCH) communication; and
means for transmitting, based at least in part on the DCI message requesting the bandwidth part switching and a PDSCH to HARQ feedback timing indicator of the DCI message, the one-shot HARQ feedback.

27. The apparatus of claim 26, wherein a time to transmit the one-shot HARQ feedback is based at least in part on a slot or sub-slot during which the apparatus receives the DCI message and the PDSCH to HARQ feedback timing indicator of the DCI message.

28. The apparatus of claim 26, wherein a time to transmit the one-shot HARQ feedback is based at least in part on a reference time and the PDSCH to HARQ feedback timing indicator of the DCI message.

29. The apparatus of claim 26, further comprising:
means for determining, based at least in part on the PDSCH to HARQ feedback timing indicator of the DCI message, a time to transmit the one-shot HARQ feedback.

30. The apparatus of claim 26, wherein the one-shot HARQ feedback comprises HARQ acknowledgment (HARQ-ACK) feedback for one or more configured HARQ processes for one or more component carriers over which the apparatus communicates with a network.

* * * * *